US012639322B2

(12) United States Patent
Cho et al.

(10) Patent No.: US 12,639,322 B2
(45) Date of Patent: May 26, 2026

(54) QUERY FILTER SIZE ESTIMATION USING PROJECTION HISTOGRAMS

(71) Applicant: SAP SE, Walldorf (DE)

(72) Inventors: Young Goo Cho, Seoul (KR); Jaehyok Chong, Seoul (KR)

(73) Assignee: SAP SE, Walldorf (DE)

(*) Notice: Subject to any disclaimer, the term of this patent is extended or adjusted under 35 U.S.C. 154(b) by 0 days.

(21) Appl. No.: 18/946,348

(22) Filed: Nov. 13, 2024

(65) Prior Publication Data

US 2026/0133981 A1     May 14, 2026

(51) Int. Cl.
*G06F 16/2458*     (2019.01)
*G06F 16/2453*     (2019.01)

(52) U.S. Cl.
CPC ...... *G06F 16/2462* (2019.01); *G06F 16/2453* (2019.01)

(58) Field of Classification Search
CPC ......................... G06F 16/2462; G06F 16/2453
See application file for complete search history.

(56) References Cited

U.S. PATENT DOCUMENTS

| | | | | |
|---|---|---|---|---|
| 6,317,703 | B1 * | 11/2001 | Linsker | H04R 3/005 |
| | | | | 702/191 |
| 6,381,616 | B1 * | 4/2002 | Larson | G06F 16/24528 |
| 10,169,412 | B2 * | 1/2019 | Gaza | G06F 16/24575 |
| 10,345,440 | B1 * | 7/2019 | West | G01S 13/9027 |
| 10,970,295 | B2 * | 4/2021 | Burger | G06F 16/2465 |
| 11,669,519 | B2 * | 6/2023 | Frost | G06F 16/217 |
| | | | | 707/769 |

(Continued)

FOREIGN PATENT DOCUMENTS

| | | | | | |
|---|---|---|---|---|---|
| CN | 108985324 | A | * 12/2018 | ........... | G06F 18/214 |
| CN | 110298400 | A | * 10/2019 | ....... | G06F 18/23213 |

(Continued)

OTHER PUBLICATIONS

Schulz, "Combining Histograms and HyperLogLog Sketches for Distinct Value Estimation," Bachelor Thesis, 100 pages, Jul. 31, 2020.

(Continued)

*Primary Examiner* — Neveen Abel Jalil
*Assistant Examiner* — Hubert Cheung
(74) *Attorney, Agent, or Firm* — Klarquist Sparkman, LLP

(57) ABSTRACT

A computer implemented method can receive a query for a database table. The query has a filter having a first predicate and a second predicate. The first predicate specifies a first condition evaluating values in a first column of the database table and the second predicate specifies a second condition evaluating values in a second column of the database table. The method can obtain a projection histogram including base statistics of the first column and projected statistics of the second column and determine an output size of the filter based on the projection histogram. The base statistics includes a plurality of intervals and respective counts of cells in the first column whose values are within corresponding intervals. The projected statistics includes a plurality of ranges corresponding to the plurality of intervals, respectively. Related systems and software for implementing the method are also disclosed.

20 Claims, 11 Drawing Sheets

Receive a query for a database table, wherein the query has a filter comprising a first predicate specifying a first condition for a first column of the table and a second predicate specifying a second condition for a second column of the table. 410

Obtain a projection histogram comprising base statistics of the first column and projected statistics of the second column. 420

Determine an output size of the filter based on the projection histogram. 430

400

(56) References Cited

U.S. PATENT DOCUMENTS

| | | | | |
|---|---|---|---|---|
| 2003/0135485 A1* | 7/2003 | Leslie | ............... | G06F 16/24545 |
| 2005/0004907 A1* | 1/2005 | Bruno | ............... | G06F 16/24545 |
| 2007/0233637 A1* | 10/2007 | Corvinelli | ........... | G06F 16/2462 |
| 2008/0235181 A1* | 9/2008 | Faunce | ............. | G06F 16/24545 |
| 2008/0238861 A1* | 10/2008 | Honda | ................. | G09G 3/3406 |
| | | | | 382/168 |
| 2009/0018992 A1* | 1/2009 | Zuzarte | ............. | G06F 16/24524 |
| 2011/0082854 A1* | 4/2011 | Eidson | ............... | G06F 16/2453 |
| | | | | 707/E17.017 |
| 2011/0246449 A1* | 10/2011 | Collins | ............. | G06F 16/24542 |
| | | | | 707/715 |
| 2014/0156633 A1* | 6/2014 | Duan | ................. | G06F 16/9024 |
| | | | | 707/713 |
| 2014/0310302 A1* | 10/2014 | Wu | ....................... | G06F 16/245 |
| | | | | 707/769 |
| 2014/0379108 A1* | 12/2014 | Vesa | ....................... | G06F 3/165 |
| | | | | 700/94 |
| 2017/0031967 A1* | 2/2017 | Chavan | ............... | G06F 12/0802 |
| 2020/0364227 A1* | 11/2020 | Mathew | .............. | G06F 16/2453 |
| 2021/0286809 A1* | 9/2021 | Frost | ................... | G06F 16/2428 |
| 2023/0087753 A1* | 3/2023 | Schulz | ............... | G06F 16/2365 |
| | | | | 707/718 |
| 2025/0209084 A1* | 6/2025 | Srivastava | ............ | G06F 16/285 |

FOREIGN PATENT DOCUMENTS

| | | | | | |
|---|---|---|---|---|---|
| CN | 107169138 | B | * | 7/2020 | |
| CN | 116071721 | A | * | 5/2023 | ............. G06V 20/56 |
| CN | 118157629 | A | * | 6/2024 | ......... H03H 17/0202 |
| EP | 2998882 | A1 | * | 3/2016 | .......... G06F 16/245 |
| JP | H01162992 | A | * | 6/1989 | |
| WO | WO-2016176157 | A1 | * | 11/2016 | ........... G06F 16/256 |

OTHER PUBLICATIONS

Wikipedia, "HyperLogLog," https://en.wikipedia.org/wiki/HyperLogLog, 5 pages (downloaded Sep. 9, 2024).

* cited by examiner

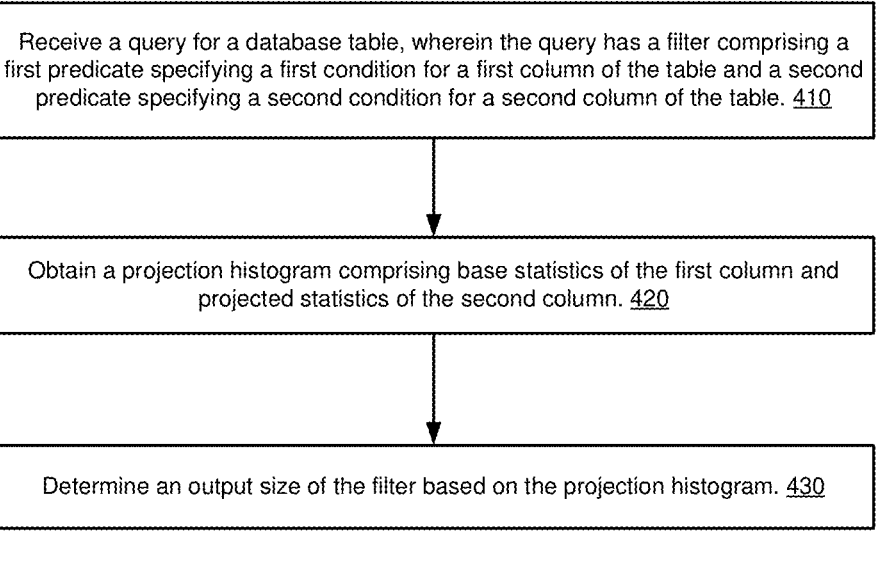

Receive a query for a database table, wherein the query has a filter comprising a first predicate specifying a first condition for a first column of the table and a second predicate specifying a second condition for a second column of the table. 410

Obtain a projection histogram comprising base statistics of the first column and projected statistics of the second column. 420

Determine an output size of the filter based on the projection histogram. 430

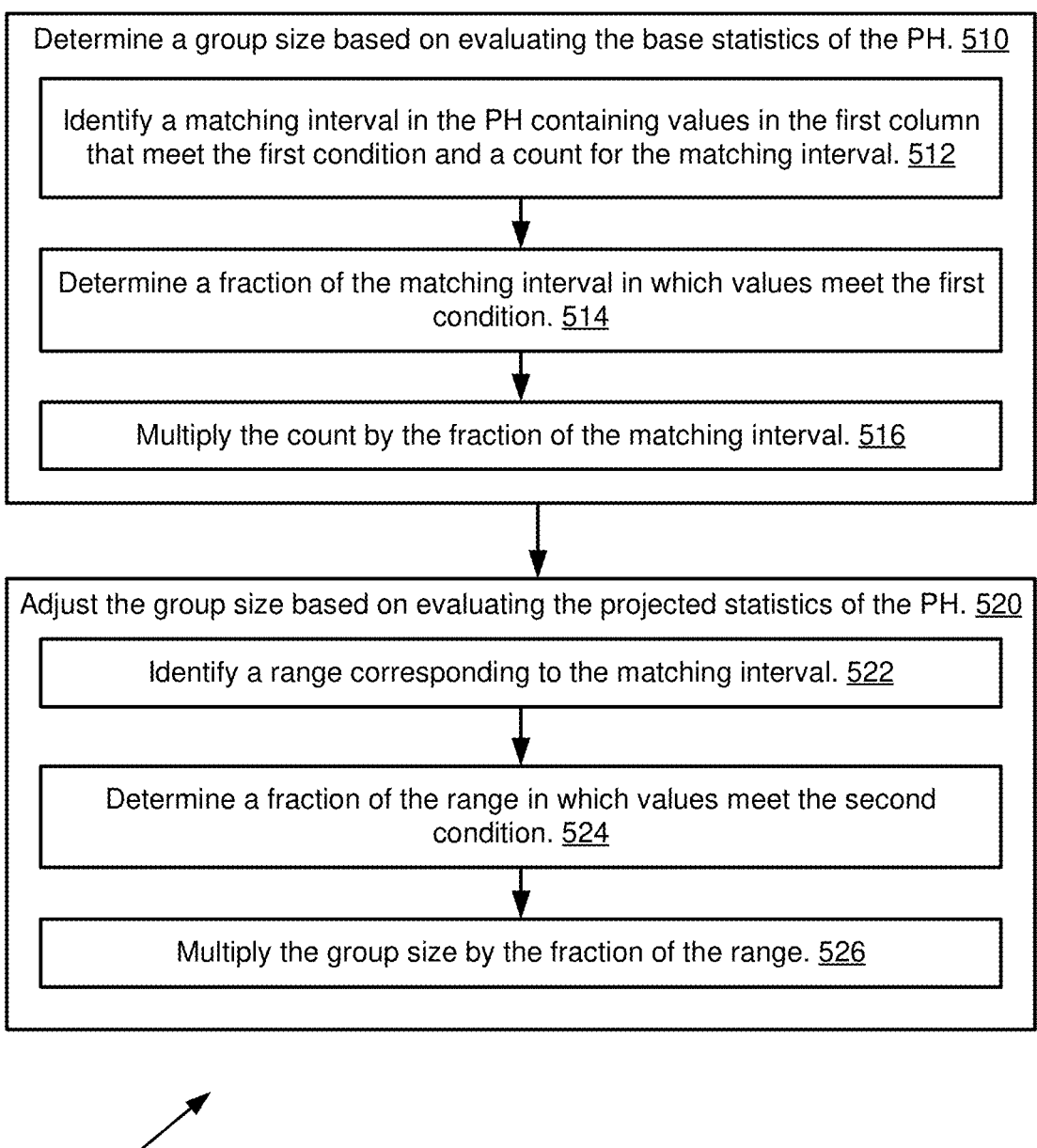

Determine a group size based on evaluating the base statistics of the PH. 510

Identify a matching interval in the PH containing values in the first column that meet the first condition and a count for the matching interval. 512

Determine a fraction of the matching interval in which values meet the first condition. 514

Multiply the count by the fraction of the matching interval. 516

Adjust the group size based on evaluating the projected statistics of the PH. 520

Identify a range corresponding to the matching interval. 522

Determine a fraction of the range in which values meet the second condition. 524

Multiply the group size by the fraction of the range. 526

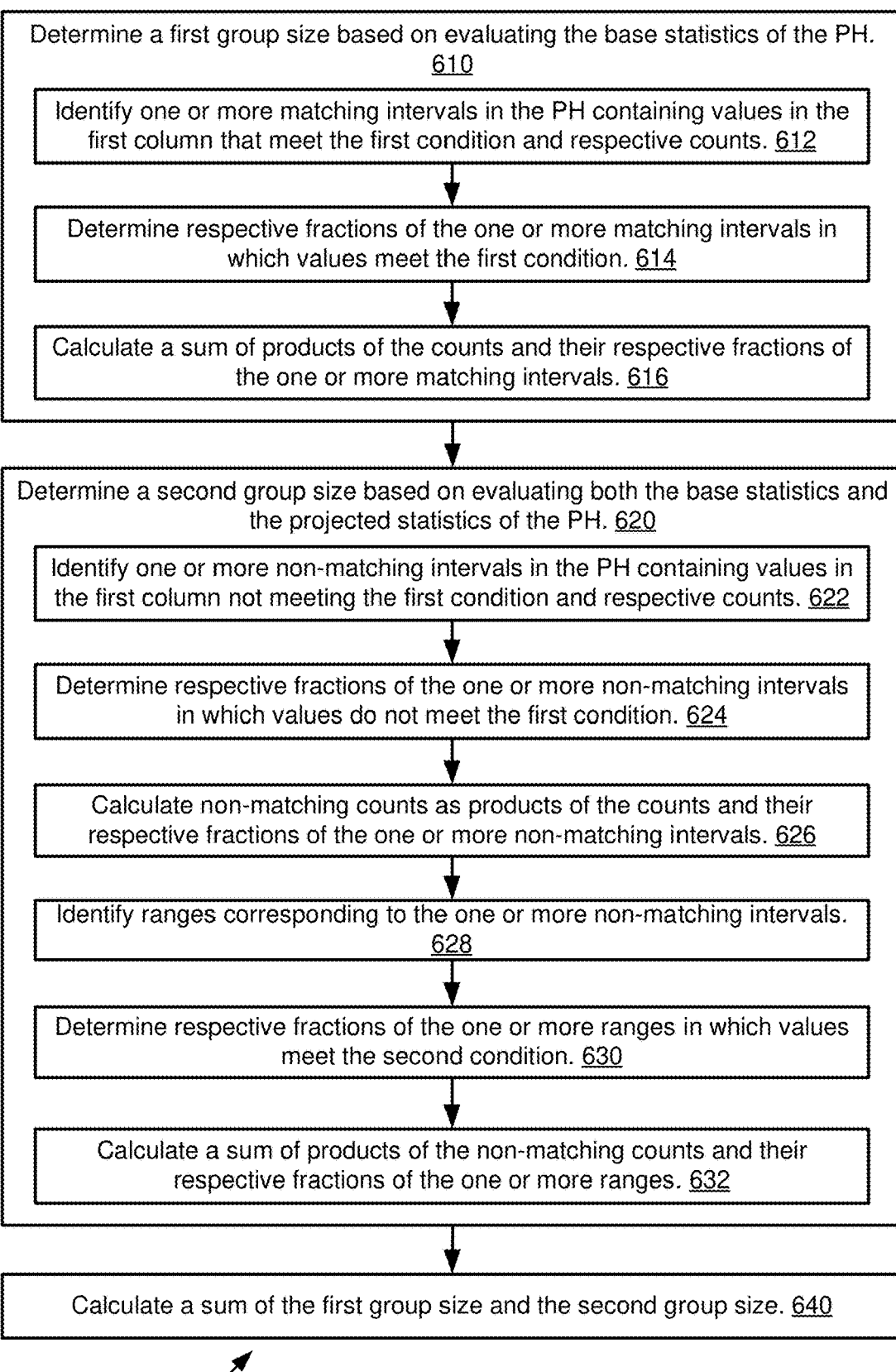

Determine a first group size based on evaluating the base statistics of the PH. 610

Identify one or more matching intervals in the PH containing values in the first column that meet the first condition and respective counts. 612

Determine respective fractions of the one or more matching intervals in which values meet the first condition. 614

Calculate a sum of products of the counts and their respective fractions of the one or more matching intervals. 616

Determine a second group size based on evaluating both the base statistics and the projected statistics of the PH. 620

Identify one or more non-matching intervals in the PH containing values in the first column not meeting the first condition and respective counts. 622

Determine respective fractions of the one or more non-matching intervals in which values do not meet the first condition. 624

Calculate non-matching counts as products of the counts and their respective fractions of the one or more non-matching intervals. 626

Identify ranges corresponding to the one or more non-matching intervals. 628

Determine respective fractions of the one or more ranges in which values meet the second condition. 630

Calculate a sum of products of the non-matching counts and their respective fractions of the one or more ranges. 632

Calculate a sum of the first group size and the second group size. 640

COMPUTING ENVIRONMENT 1000

1030 central processing unit 1010 graphics or co-processing unit 1015

MEMORY 1020

MEMORY 1025

COMMUNICATION CONNECTION(S) 1070

INPUT DEVICE(S) 1050

OUTPUT DEVICE(S) 1060

STORAGE 1040

SOFTWARE 1080 IMPLEMENTING TECHNOLOGIES

QUERY FILTER SIZE ESTIMATION USING PROJECTION HISTOGRAMS

BACKGROUND

In column store relational databases, data is stored by attributes in columns. Structured query language (SQL) is a standard language for storing and processing information in these relational databases. Query optimization aims to select the most efficient execution plan for a given SQL query. An important step in query optimization is estimating the query's filter size, which refers to the number of rows that meet certain query conditions. However, accurately predicting the filter size can be challenging due to the common assumption that table columns are statistically independent. In reality, dependencies often exist between columns, which can lead to inaccuracies in the estimates. These inaccuracies can cause suboptimal execution plans, increasing query execution time and resource consumption. Thus, room for improvement exists in refining filter size estimation methods to account for interdependencies between columns.

BRIEF DESCRIPTION OF THE DRAWINGS

FIG. 4 is a flowchart illustrating an example overall method for performing improved query filter size estimation.

FIG. 5 is a flowchart illustrating an example method for determining output size of a query filter including conjunctive predicates.

FIG. 6 is a flowchart illustrating an example method for determining output size of a query filter including disjunctive predicates.

DETAILED DESCRIPTION

Overview of Query Filter Size Estimation

The aim of query optimization is to select a query plan (from many candidate query plans) that yields optimal performance. Performance of a query plan can be described in terms of cost, which can be time (e.g., time required to execute the query plan) and/or burden on computing resources (e.g., processing power and/or memory expended to execute the query plan). Cost-based query optimization chooses the query plan with the lowest cost among all candidate query plans. In practice, although the terms "optimal" and "optimize" are used, the actual best plan may not be selected, but the selected plan is deemed better than others based on data available to the optimizer.

Accurate filter size estimation is important for query optimization because it directly influences the selection of the execution plan. The query optimizer often uses filter size estimates to predict the number of rows that will be processed at each step of the query execution. These predictions help determine the most efficient way to access and join tables, choose appropriate indexes, and allocate resources. If the filter size is underestimated, the chosen plan might not allocate enough resources, leading to longer execution times and potential resource contention. Conversely, overestimation can result in over-allocation of resources, wasting memory and processing power. Thus, accurate filter size estimation can balance performance and resource utilization.

Histograms are commonly used to estimate the filter size in query optimization. A histogram can divide data values in a specific column into intervals (which can also be referred to as "buckets" or "bins"). Each interval can include information like the minimum and maximum values of the interval, the record count, which indicates the number of rows with values in that column falling within the interval, and the distinct value count, which represents the number of unique values in that column within the interval. Column data values can be organized as equi-width or equi-depth histograms. An equi-width histogram divides the range of data values into intervals of equal width, while an equi-depth histogram divides the data into intervals that each contain an approximately equal number of records.

Figure 1:
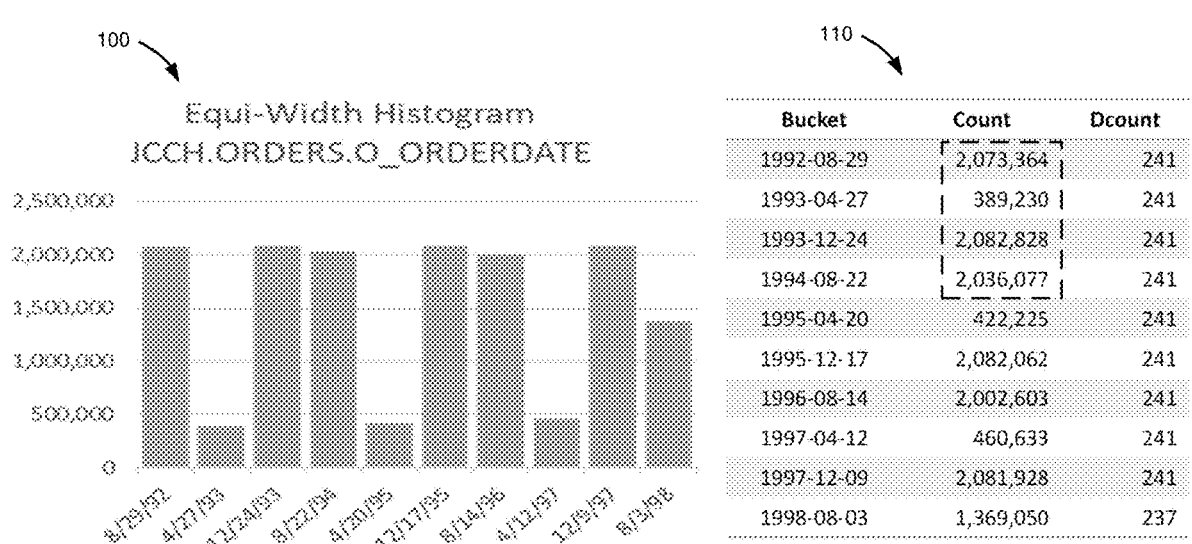
FIG. 1 illustrates a conventional histogram constructed based on data values stored in a column of a database table, according to one example.

For example, FIG. 1 shows a graphical representation 100 of a histogram 110 constructed based on order dates stored in a column 'O_ORDERDATE' of an ORDERS table. The histogram 110 is organized as an equi-width histogram, where the range of order dates is divided into intervals of equal width. Each bucket in the histogram 110 represents one of these intervals and includes the record count ('Count') and the distinct value count ('DCount'). In this example, the ORDERS table has 15,000,000 records that are divided into 10 buckets or intervals. For instance, one bucket for order dates up to '1992-08-29' with 2,073,364 records, another for dates between '1992-08-30' and '1993-04-27' with 389,230 records, and so on.

Let's assume a query having the following filter: O_ORDERDATE <'1994-02-15', and the actual number of records satisfying this filter (i.e., actual filter size) is 4,627,973. The filter selectivity in this example would be the ratio of 4,627,973 to 15,000,000, that is 0.30853. Using the histogram 110, the number of records satisfying the filter can be estimated as the sum of all records in the buckets up to '1993-12-24' plus a fraction of the records in the interval between '1993-12-24' and '1994-08-22.' Since the cutoff date '1994-02-15' falls within this interval, linear interpolation can be used to estimate the proportion of records. Assuming the order dates are uniformly distributed in this interval, the fraction of records corresponding to the 52 days from '1993-12-24' to '1994-02-15' out of the total 241 days in the interval can be calculated as (52/241). Thus, the estimated number of records (i.e., estimated filter size) would be 2,073,364+389,230+2,082,828+ (2,036,077*(52/241))=4,984,742. Thus, the estimated filter selectivity would be 4,984,742/15,000,000=0.33232.

When a filter condition involves more than one column, estimating the filter size accurately can become complex. Conventional methods often rely on the assumption that table columns are statistically independent. This assumption can simplify the estimation process by allowing the query optimizer to calculate the filter size for each column separately and then combine these estimates to obtain a final result. However, in reality, columns are often correlated, and ignoring these correlations can lead to inaccurate estimates. For instance, if there is a strong relationship between columns, such as a correlation between product price and sales volume, treating them as independent could result in significantly miscalculated filter sizes.

To address dependencies between columns, query optimizers can use multi-dimensional histograms, which capture the relationships between two or more columns by dividing the data space into multi-dimensional intervals. For example, a two-dimensional histogram might be constructed to model the correlation between product price and sales volume, allowing the optimizer to estimate filter sizes more accurately for conditions involving both columns.

However, using multi-dimensional histograms presents significant challenges. As the number of columns increases, the complexity and size of these histograms grow exponentially, making them difficult to maintain and update. This increased complexity leads to higher storage requirements and computational overhead, which can be impractical for large datasets or dynamic data environments. Thus, while multi-dimensional histograms offer a more precise method for capturing column dependencies than one-dimensional histograms, they have inherent limitations in terms of scalability, especially when dealing with complex filter conditions involving multiple columns.

The technologies described herein provide a more memory-efficient approach for estimating query filter sizes under complex filter conditions. As described more fully below, by using projection histograms and a technique called histogram chaining, it is possible to achieve estimations comparable to those obtained with multi-dimensional histograms, but with significantly reduced memory consumption.

Figure 2:
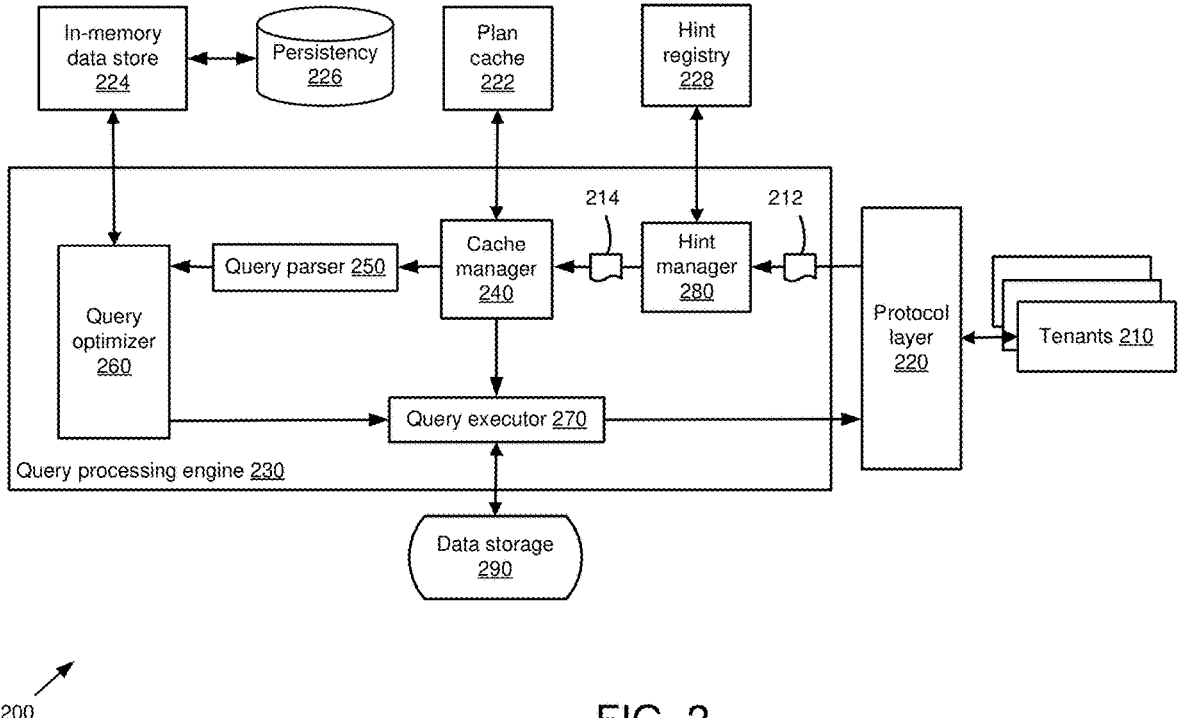
FIG. 2 is an overall block diagram of an example database management system supporting improved query filter size estimation technology disclosed here.

Example Database System Supporting Improved
Filter Size Estimation Using Projection Histograms FIG. 2 shows an overall block diagram of an example database management system 200 supporting improved filter size estimation using projection histograms. The database management system 200 can be configured to support multi-tenancy, which is a feature in many types of cloud computing services. In a multi-tenancy environment, one instance of a software application and supporting infrastructure (e.g., virtual machines, memories, etc.) can serve multiple user groups, or tenants. Thus, multiple tenants can share the same application and other computing resources running on the same operating system, on the same hardware, with the same data-storage mechanism(s). Even though resources are shared, each tenant can appear to have its own instance of the application. Importantly, the underlying data of the tenants can be kept separate and secure.

As shown, the database management system 200 includes a query processing engine 230 and a protocol layer 220 which serves as an interface between one or more tenants 210 and the query processing engine 230. For example, the protocol layer 220 can implement a server name indication protocol by which the tenants 210 can connect to the query processing engine 230. Each tenant 210 represents a group of users who can access a tenant-specific database (e.g., data storage 290) managed by the database management system 200.

In some examples, the query processing engine 230 can include a hint manager 280, a cache manager 240, a query parser 250, a query optimizer 260, and a query executor 270.

An incoming query 212 sent from a tenant 210 can be processed by the hint manager 280 to output a query 214, which can be the same as or different from the incoming query 212. The hint manager 280 maintains a hint registry 228. The hint registry 228 can store hint records, each of which includes a hint target and a hint (also referred to as a "hint string") paired with the hint target. In some examples, a hint target can be a query statement, which can also be referred to as a "target query statement." In this scenario, the hint in the hint record can be paired with the target query statement. In some examples, a hint target can be one or more database objects, which can also be referred to as "target objects." In this scenario, the hint in the hint record can be paired with the one or more target objects.

The hint manager 280 can search the hint registry 228 to identify if the incoming query 212 has a matching hint record. If a match is found, the hint specified in the hint record can be added to the incoming query 212, modifying it into a new query. This modified query is then propagated downstream for further processing. If no matching hint record is found, the incoming query 212 is not modified and can be passed directly for downstream query processing.

For hint records containing hint targets that are target query statements, the hint manager 280 can use string comparison to determine if the incoming query 212 matches any of the target query statements. The target query statements can be patterned or non-patterned. As described herein, a patterned query statement includes a wildcard expression, whereas a non-patterned query statement is absent of a wildcard. A wildcard expression can be a special character or sequence of characters that matches any character or set of characters in a string. This wildcard can take various forms, including matching any literals, matching literals within a set of constants, matching literals within a range, or matching literals that start with a specific string or are of a specific datatype.

For hint records containing hint targets that are target objects, the hint manager 280 can parse the incoming query 212 to determine if the target objects appear in the incoming query 212. For example, a hint paired to a target object can be appended to any incoming queries in which the target object is specified. As described herein, the target objects can include database tables, database views, table functions, synonyms, sequences, etc.

The cache manager 240 can access a plan cache 222, which represents a fast-access memory space configured to store previously compiled query plans. The cache manager 240 receives the query 214 (which can be the incoming query 212 added with a hint or the unmodified incoming query 212) sent from the hint manager 280. The cache manager 240 can evaluate the received query 214 to determine if the query 214 has a corresponding (previously compiled) query plan stored in the plan cache 222.

If the cache manager 240 finds no query plan in the plan cache 222 that corresponds to the query 214, the query 214 can be analyzed by the query parser 250, which can check if the query 214 contains syntactic and/or semantic errors. After verifying that the query 214 is a valid transactional SQL statement (e.g., SELECT, INSERT, UPDATE, DELETE, MERGE, etc.), the query parser 250 can generate a logical tree (also referred to as a "query tree") in which the query 214 can be executed.

As described herein, a query tree is a logical representation of the query statement. It includes a plurality of nodes and edges linking the nodes. The nodes can include leaf nodes and one or more internal nodes. A leaf node has no child nodes. In contrast, an internal node has one or more child nodes. The root of the query tree, or root node, can be regarded as a special internal node. The query tree denotes a relational algebra expression. Specifically, tables involved in the query can be represented as leaf nodes. The relational algebra operations can be represented as internal nodes. The root node represents the query as a whole and can also be referred to as a "project" node. When a query plan is executed, an internal node can be executed when its operand tables are available. The internal node can then be replaced by a result table generated by the operation represented by the internal node. This process can continue for all internal nodes until the root node is executed and replaced by the result table, which can be returned as query results.

The logical tree can be used by the query optimizer 260 to generate a corresponding query plan, which determines how the query 214 will be executed. The query optimizer 260 is configured to select a query plan (among a plurality of query plans that are generated based on enumeration of the logical tree) that yields optimal performance. Performance of a query plan can be described in terms of cost, which can be time (e.g., time required to execute the query plan) and/or burden on computing resources (e.g., processing power and/or memory expended to execute the query plan). Cost-based query optimization chooses the query plan with the lowest cost among all candidate query plans. In practice, although the terms "optimal" and "optimize" are used, the actual best query plan may not be selected, but the selected query plan is deemed better than others based on data available to the query optimizer 260.

The determined optimal query plan can then be sent to the query executor 270 for execution. The query executor 270 can communicate with a data storage 290 and execute operators in the query plan determined by the query optimizer 260. Data retrieved from the data storage 290 can be returned to the tenant 210 via the protocol layer 220.

In some examples, the query optimizer 260 can include a filter size estimator configured to estimate the filter size of the query 214 based on one or more projection histograms, which can be generated by a projection histogram engine, as described more fully below.

The query optimizer 260 can bidirectionally communicate with an in-memory data store 224 configured to store intermediate results of query optimization, such as runtime statistics, hash table, indexes, projection histograms, etc. In some examples, the in-memory data store 224 can also maintain an execution history storing one or more serialized query plans, which can also be referred to as "abstract query plans" or ASPs. The execution history can be used to implement a feature called "plan stability." Plan stability operates by capturing selected ASPs and storing them in the execution history. If performance regression for a query plan occurs, these stored ASPs can be reused to regenerate the original query plans, thereby retaining the original performance. Data stored in the in-memory data store 224 can be persisted to a persistence layer 226. The in-memory data store 224 is a volatile memory, which allows for fast access and manipulation of the data stored therein. The persistence layer 226 can ensure that the ASPs, hash tables, indexes, etc., are retained even when the volatile memory is cleared during a system restart. This allows for the data to be reloaded from the persistence layer 226 back into the in-memory data store 224, e.g., after the system restart.

As described herein, query compilation refers to the process of generating the optimal query plan (e.g., checking syntactic and/or semantic errors, generating the logical tree, and determining optimal query plan) for the query 214, as described above. Depending on the complexity of the query 214 (e.g., the number of joined tables, etc.) and the query optimization algorithm, query compilation time can be long (e.g., tens of seconds or more). Thus, to improve operational efficiency, the compiled query plan (i.e., the determined most optimal query plan) for the query 214 can be stored in the plan cache 222 so that it can be quickly retrieved and reused if the same query is encountered again in the future.

For example, if the cache manager 240 determines that the query 214 has a corresponding query plan stored in the plan cache 222, that query plan can be fetched directly from the plan cache 222 and forwarded to the query executor 270 for execution. Thus, in this scenario, operations by the query parser 250 and query optimizer 260 can be bypassed. In other words, the query 214 does not need to be recompiled because its previously compiled query plan is available in the plan cache 222.

The plan cache 222 is configured to store compiled query plans. For each received query 214, the cache manager 240 checks if it has a compiled query plan stored in the plan cache 222. If yes, then this cached query plan can be reused. This can improve efficiency because it eliminates the time of compiling the query 214 (i.e., regenerating the query plan). On the other hand, if the query 214 has no previously compiled query plan stored in the plan cache 222, the query 214 has to be compiled. The compiled query plan can then be stored in the plan cache 222 so that when the same query 214 occurs again in the future, fast access to its cached query plan is feasible.

If the received query 214 is new (i.e., a first-time query that has not been encountered before), this new query has no corresponding query plan in the plan cache 222 and it must be compiled for the first time. On the other hand, if the received query 214 is not new (e.g., the same query has been encountered at least once before), whether or not there is a corresponding compiled query plan in the plan cache 222 can depend on the size of the plan cache 222 and a plan eviction policy adopted by the cache manager 240.

The plan cache 222 has a limited size. Thus, it may not be able to store all compiled query plans. When the plan cache 222 approaches its full capacity, certain query plans may have to be evicted from the plan cache 222 to make room for new ones according to a predefined plan eviction policy implemented by the cache manager 240. For example, the cache manager 240 can implement a random plan eviction policy which evicts query plans from the plan cache 222 in a random manner. In another example, the cache manager 240 can implement the least recently used (LRU) plan eviction policy which removes the least recently used query plans first from the plan cache 222. In yet another example, the least frequently used (LFU) plan eviction policy can be used which first evicts the execution policies that are used least often. Other plan eviction policies can also be used by the cache manager 240.

In practice, the systems shown herein, such as database management system 200, can vary in complexity, with additional functionality, more complex components, and the like. For example, there can be additional functionality within the query processing engine 230. Additional components can be included to implement security, redundancy, load balancing, report design, and the like.

The described computing systems can be networked via wired or wireless network connections, including the Internet. Alternatively, systems can be connected through an intranet connection (e.g., in a corporate environment, government environment, or the like).

The database management system 200 and any of the other systems described herein can be implemented in conjunction with any of the hardware components described herein, such as the computing systems described below (e.g., processing units, memory, and the like). In any of the examples herein, the queries, query plans, indexes, hash tables, projection histograms, and the like can be stored in one or more computer-readable storage media or computer-readable storage devices. The technologies described herein can be generic to the specifics of operating systems or hardware and can be applied in any variety of environments to take advantage of the described features.

Example Projection Histogram Engine and Filter Size Estimator

As described herein, a projection histogram, denoted as PH(A→B), is a specialized data structure designed to capture statistical information and correlations between two columns in a database table. In this notation, A represents the source column (or base column), B represents the target column (or projected column), and PH(A→B) can also be referred to as the projection histogram from A to B. The projection histogram PH(A→B) contains base statistics for the source column A and projected statistics for the target column B. The base statistics divide the values in the source column A into multiple intervals (or buckets), with each interval containing a count representing the number of records (e.g., rows) that fall within that interval. For each interval in the source column A, the projected statistics provide a corresponding range of values in the target column B, defined by the minimum and maximum values of the cells in the target column B that are part of the records within the specified interval of A.

In other words, the projection histogram PH(A→B) organizes and associates each interval of the source column A with a corresponding range of values in the target column B, thereby capturing the relationship between these two columns. This structure not only maintains counts of values in A within intervals but also encodes information about the correlation between columns A and B by specifying the distribution range of B for each interval in A. By capturing these correlations, the projection histogram PH(A→B) enables more efficient and accurate estimation of query filter sizes involving multiple columns while reducing the memory overhead typically associated with traditional multi-dimensional histograms, as described more fully below.

Figure 3:
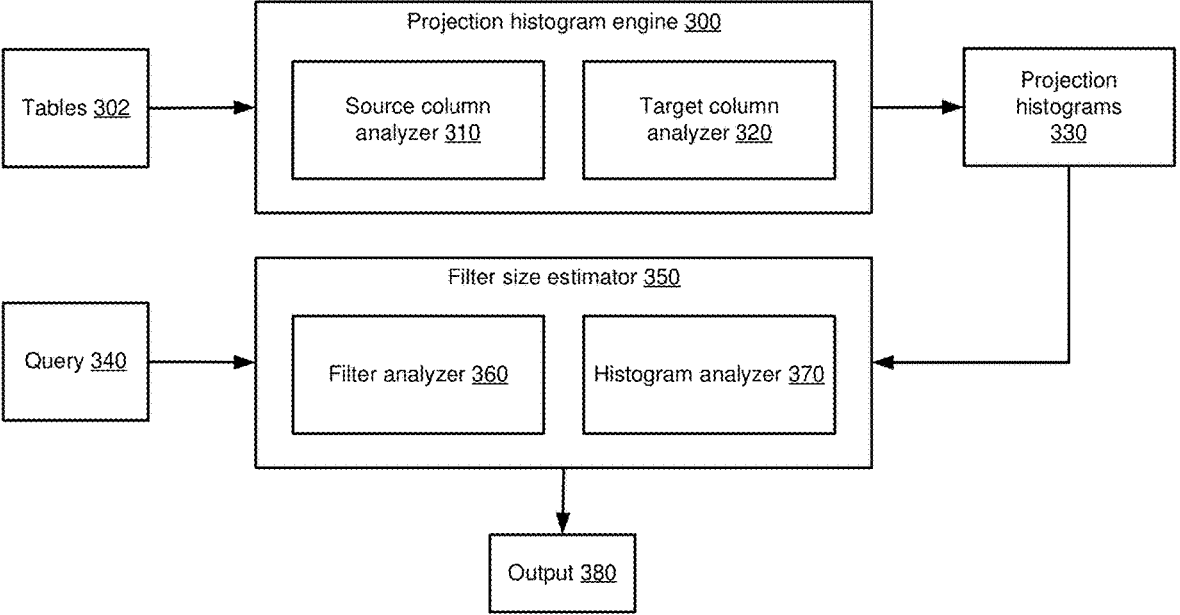
FIG. 3 is a block diagram depicting example components and operations for constructing projection histograms and using the same for improved query filter size estimation.

FIG. 3 is a block diagram depicting example components and operations for constructing projection histograms and using the same for improved query filter size estimation.

For each database table 302 including multiple columns of data values with corresponding attributes, one or more projection histograms 330 can be generated by projection histogram engine 300. In some examples, the projection histogram engine 300 can be a separate component of the query processing engine 230 which can communicate with the data storage 290 containing the database table 302. In some examples, the projection histograms 330 can be created a priori (e.g., before executing queries involving the table 302) and stored in the in-memory data store 224 and/or the persistency 226. This allows for the projection histograms 330 to be retrieved directly from the storage locations during query processing, thereby reducing the computational overhead and latency associated with on-the-fly histogram generation. In other examples, the projection histograms 330 can be created dynamically or on-demand during query filter size estimation, based on the specific columns involved in the query conditions. This dynamic generation approach can provide flexibility in cases where the projection histograms 330 are not precomputed or when queries involve less frequently accessed column combinations.

As shown, the projection histogram engine 300 can include a source column analyzer 310 and a target column analyzer 320. The source column analyzer 310 can be configured to divide values in a selected source column of a database table 302 into multiple intervals or buckets based on a specified range or distribution criteria, where the divided intervals can be equi-width or equi-depth. For each interval, the source column analyzer 310 can generate a count representing the number of records (e.g., rows) that contain values falling within that specific interval. The generated intervals and corresponding record counts serve as the base statistics of all projection histograms 330 that can be projected from the selected source column to any target column within the database table.

The target column analyzer 320 can be configured to generate ranges of values in a selected target column of the database table 302, with each range corresponding to a specific interval determined by the source column analyzer 310. Specifically, for every interval determined by the source column analyzer 310, the target column analyzer 320 can identify the minimum and maximum values of the values in the selected target column that fall within that interval. In some examples, the target column analyzer 320 can also calculate additional statistics, such as the distinct value counts of values in the selected target column that correspond to each interval. The generated ranges (along with other statistics of the selected target column, if any) serve as the projected statistics of the projection histogram 330 from the selected source column to the selected target column.

In sum, the base statistics derived from a source column (generated by the source column analyzer 310), in conjunction with the projected statistics derived from a target column (generated by the target column analyzer 320), collectively form the projection histogram 330 from the source column to the target column.

In some examples, the filter size estimator 350 can be a component of the query optimizer 260. For a given query 340 including a filter specifying conditions on one or more columns of a database table 302, the filter size estimator 350 is configured to estimate the filter size, that is, the number of records in the database table 302 that satisfy the filter conditions based on available projection histograms 330 generated from the one or more columns.

As shown, the filter size estimator 350 can include a filter analyzer 360 and a histogram analyzer 370. The filter analyzer 360 can be configured to parse the query 340 to identify one or more predicates of the filter included in the query 340. Each predicate can specify a condition evaluating values in a selected column of a database table. A predicate can include an attribute name (e.g., for the selected column), an operator (such as '=', '<', '>', 'BETWEEN', or the like), and a literal or a set of literal values against which the attribute is compared. When the query filter includes multiple predicates, the filter analyzer 360 can also identify relationship between those predicates such as conjunctive or disjunctive relationship.

Based on the predicates and their relationship identified by the filter analyzer 360, the histogram analyzer 370 can be configured to analyze statistics (including base statistics and projected statistics) contained in one or more project histograms 330 corresponding to the columns specified by those predicates. Specifically, for each predicate, the histogram analyzer 370 can determine the relevant intervals in the source column, and for each interval, retrieve the associated projected statistics (e.g., the range and distinct value count) for the target column. The histogram analyzer 370 can then calculate the estimated number of records satisfying each predicate and their relationships (e.g., conjunctive or disjunctive), as described more fully below. The estimated number of records, or the estimated query filter size, can be part of an output 380 of the filter size estimator 350. In some examples, the histogram analyzer 370 can also estimate, using relevant projection histograms 330, the output size of a group-by clause, which can also be included in the output 380.

Example Overall Method for Estimating Query Filter Size Using Projection Histograms FIG. 4 is a flowchart illustrating an overall method 400 of estimating query filter size using projection histograms, and can be performed, for example, by the filter size estimator 350 of FIG. 3.

At step 410, the method 400 can receive a query for a database table. The query has a filter comprising a first predicate and a second predicate. The first predicate specifies a first condition evaluating values in a first column of the database table, and the second predicate specifies a second condition evaluating values in a second column of the database table.

At step 420, the method 400 can obtain a projection histogram including base statistics of the first column and projected statistics of the second column.

The base statistics of the first column includes a plurality of intervals and respective counts of cells in the first column whose values are within corresponding intervals. A selected interval defines a set of rows containing a first set of cells in the first column whose values are within the selected interval. The projected statistics of the second column includes a plurality of ranges corresponding to the plurality of intervals, respectively. The set of rows defined by the selected interval contains a second set of cells in the second column. A range corresponding to the selected interval is defined by a minimum and a maximum of values in the second set of cells.

Then at step 430, the method 400 can determine an output size of the filter based on the projection histogram.

Specific methods for determining the output size of the filter can depend on the relationship between the first predicate and second predicate, as described further below.

The method 400, and any other methods described herein can be performed by computer-executable instructions (e.g., causing a computing system to perform the method) stored in one or more computer-readable media (e.g., storage or other tangible media) or stored in one or more computer-readable storage devices. Such methods can be performed in software, firmware, hardware, or combinations thereof. Such methods can be performed at least in part by a computing system (e.g., one or more computing devices).

The illustrated actions can be described from alternative perspectives while still implementing the technologies. For example, "receive" can also be described as "send" from a different perspective.

Example Method for Estimating Output Size of Filters with Conjunctive Predicates FIG. 5 is a flowchart illustrating an example method 500 for determining the output size of a query filter including conjunctive predicates. For example, the first predicate and second predicate described in the method 400 can have a conjunctive relationship, and the method 500 can be used to determine the output size of the filter at step 430.

At step 510, the method 500 can determine a group size based on evaluating the base statistics of the projection histogram (PH) using the first condition.

The step 510 can be divided into multiple sub-steps.

For example, at step 512, the method 500 can identify a matching interval in the projection histogram which contains at least some values in the first column that meet the first condition and a count corresponding to the matching interval.

At step 514, the method 500 can determine a fraction of the matching interval in which values meet the first condition.

Then at step 516, the method 500 can multiply the count by the fraction of the matching interval.

At step 520, the method 500 can adjust the group size determined at step 510 based on evaluating the projected statistics of the projection histogram using the second condition. The step 520 can also be divided into multiple sub-steps.

For example, at step 522, the method 500 can identify a range corresponding to the matching interval.

At step 524, the method 500 can determine a fraction of the range in which values meet the second condition.

Then at step 526, the method 500 can multiply the group size by the fraction of the range.

In some examples, the matching interval can be one of a plurality of matching intervals, and the plurality of matching intervals can have corresponding adjusted group sizes.

In such circumstances, determining the output size of the filter can further include summing the adjusted group sizes corresponding to the plurality of matching intervals.

In some examples, the filter can further include a third predicate which specifies a third condition evaluating values in a third column of the database table. The second predicate and the third predicate can also have a conjunctive relationship. The above-noted projection histogram can be deemed as a first projection histogram, and the group size can be deemed as a first group size. In such circumstances, determining the output size of the filter can further include the following steps:

(a) Obtain a second projection histogram including base statistics of the second column and projected statistics of the third column.

(b) Determine a second group size based on evaluating the base statistics of the second projection histogram using the second condition.

(c) Adjust the second group size based on evaluating the projected statistics of the second projection histogram using the third condition.

(d) Determine a first selectivity as a ratio of the first group size to a total number of rows in the database table.

(e) Determine a second selectivity as a ratio of the second group size to the total number of rows in the database table.

(f) Determining a product of the first selectivity and the second selectivity.

Through the above operations, the first projection histogram and the second projection histogram can be analyzed sequentially, also referred to as histogram chaining or cascaded chaining, to generate a final output size of the filter. Similar histogram chaining can be used to handle more than three predicates having conjunctive relationships. Several use cases are described below to further illustrate the method 500.

Example Method for Estimating Output Size of Filters with Disjunctive Predicates FIG. 6 is a flowchart illustrating an example method 600 for determining the output size of a query filter including disjunctive predicates. For example, the first predicate and second predicate described in the method 400 can have a disjunctive relationship, and the method 600 can be used to determine the output size of the filter at step 430.

At step 610, the method 600 can determine a first group size based on evaluating the base statistics of the projection histogram using the first condition.

At step 620, the method 600 can determine a second group size based on evaluating both the base statistics of the projection histogram using the first condition and the projected statistics of the projection histogram using the second condition.

Then at step 630, the method 600 can calculate a sum of the first group size and the second group size.

The step 610 can be divided into multiple sub-steps.

For example, at step 612, the method 600 can identify one or more matching intervals in the projection histogram which contain at least some values in the first column that meet the first condition and respective counts corresponding to the one or more matching intervals.

At step 614, the method 600 can determine respective fractions of the one or more matching intervals in which values meet the first condition.

Then at step 616, the method 600 can calculate a sum of products of the counts and their respective fractions of the one or more matching intervals.

The step 620 can also be divided into multiple sub-steps.

For example, at step 622, the method 600 can identify one or more non-matching intervals in the projection histogram which contain at least some values in the first column that do not meet the first condition and respective counts corresponding to the one or more non-matching intervals.

At step 624, the method 600 can determine respective fractions of the one or more non-matching intervals in which values do not meet the first condition.

At step 626, the method 600 can calculate non-matching counts as products of the counts and their respective fractions of the one or more non-matching intervals.

At step 628, the method 600 can identify one or more ranges corresponding to the one or more non-matching intervals, respectively.

At step 630, the method 600 can determine respective fractions of the one or more ranges in which values meet the second condition.

Then at step 632, the method 600 can calculate a sum of products of the non-matching counts and their respective fractions of the one or more ranges.

In some examples, the filter can further include a third predicate which specifies a third condition evaluating values in a third column of the database table. The second predicate and the third predicate can also have a disjunctive relationship. The above-noted projection histogram can be deemed as a first projection histogram, the one or more non-matching intervals can be deemed as first non-matching intervals, the one or more ranges can be deemed as first ranges, and the non-matching counts can be deemed as first non-matching counts. In such circumstances, determining the output size of the filter can further include the following steps:

(a) Obtaining a second projection histogram including base statistics of the second column and projected statistics of the third column.

(b) Determine a third group size based on evaluating both the base statistics of the second projection histogram using the second condition and the projected statistics of the second projection histogram using the third condition.

(c) Adding the third group size to the sum of the first group size and the second group size.

Determining the third group size can include the following sub-steps:

(c1) Identify one or more second non-matching intervals in the second projection histogram which contain at least some values in the second column that do not meet the second condition and respective counts corresponding to the one or more second non-matching intervals.

(c2) Determining respective fractions of the one or more second non-matching intervals in which values do not meet the second condition.

(c3) Calculate second non-matching counts as products of the counts and their respective fractions of the one or more second non-matching intervals.

(c4) Identify one or more second ranges corresponding to the one or more second non-matching intervals, respectively.

(c5) Determine respective fractions of the one or more second ranges in which values meet the third condition.

(c6) Calculate a sum of products of the second non-matching counts and their respective fractions of the one or more second ranges.

Through the above operations, the first projection histogram and the second projection histogram can be analyzed sequentially through histogram chaining to generate a final output size of the filter. Similar histogram chaining can be used to handle more than three predicates having disjunctive relationships. Several use cases are described below to further illustrate the method 600.

Example Projection Histograms

Figure 7:
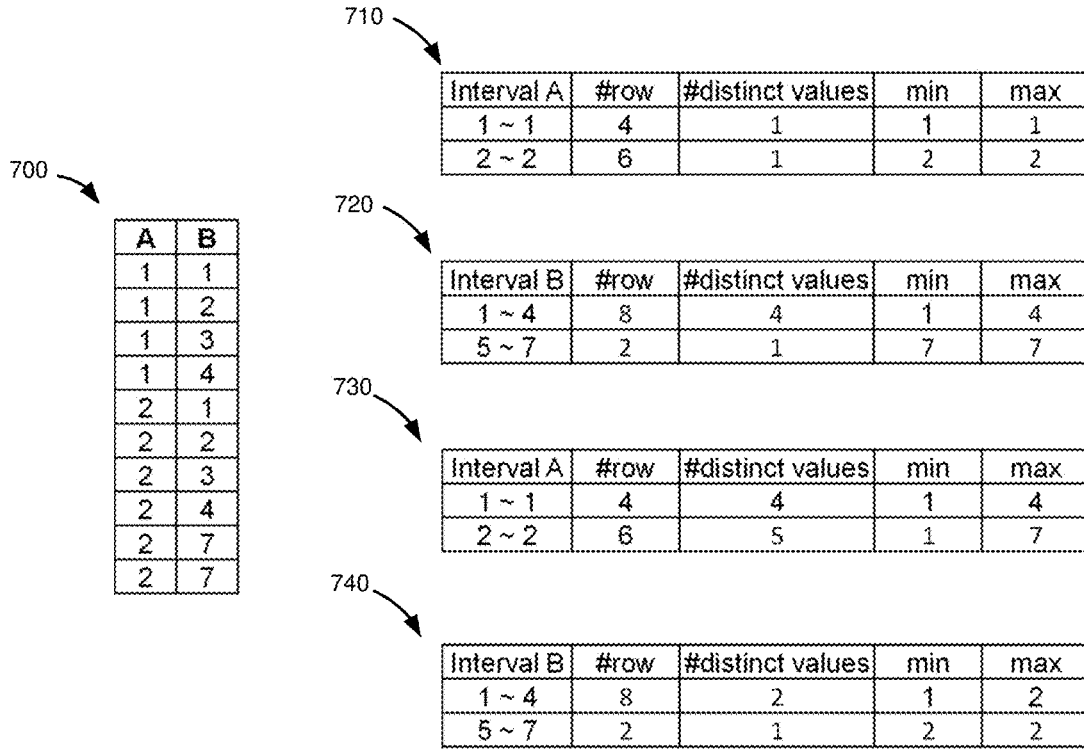
FIG. 7 depicts two projection histograms created based on two columns of an example database table.

As one example, FIG. 7 shows a database table 700 having two columns (columns A and B) and ten records or rows. Two conventional histograms 710, 720 are created based on data values stored in column A and column B, respectively. As shown, the histogram 710 divides values of column A into two intervals: [1, 1] and [2, 2]. The number of records (or row count, denoted as "#row") where values in column A are within the two intervals are 4 and 6, respectively. The distinct value counts (denoted as "#distinct values") is 1 for both intervals. The minimum and maximum values are both 1 for the first interval and are both 2 for the second interval. Similarly, the histogram 720 divides values of column B into two intervals: [1, 4] and [5, 7]. The number of records where values in column B are within the two intervals are 8 and 2, respectively. The distinct value counts for the two intervals are 4, and 1, respectively. The minimum and maximum values for the first interval are 1 and 4, respectively, and both the minimum and maximum values are 7 for the second interval.

FIG. 7 also shows two projection histograms: one projection histogram 730 from column A to column B, or PH(A→B), and another projection histogram 740 from column B to column A, or PH(B→A). As shown, the projection histogram 730 contains base statistics of column A, including the two intervals ([1, 1] and [2, 2]) and respective row counts (4, 6), which are also contained in the histogram 710. The projection histogram 730 also contains projected statistics from column B, including ranges and distinct value counts for each interval. For instance, the first four rows of table 700 correspond to the first interval ([1, 1]). In these four rows, there are 4 distinct values (e.g., 1, 2, 3, 4) in column B. The values of column B in those four rows have a range from between 1 (min) and 4 (max). Similarly, the last six rows of table 700 correspond to the second interval ([2, 2]). In these six rows, there are 5 distinct values (e.g., 1, 2, 3, 4, 7) in column B. The values of column B in those six rows have a range from between 1 (min) and 7 (max). The projection histogram 740 can be similarly constructed except that it contains the base statistics of the column B and the projected statistics from column A.

Figure 8:
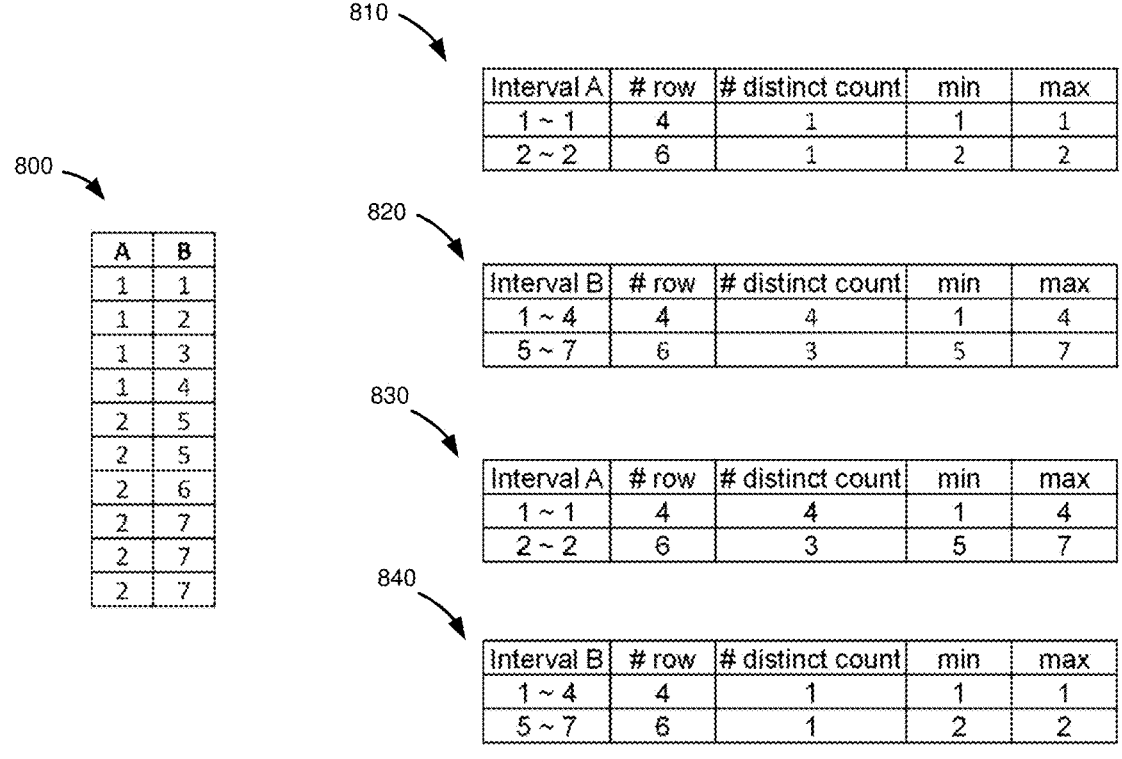
FIG. 8 depicts two projection histograms created based on two columns of another example database table.

As another example, FIG. 8 shows a database table 800 having two columns (columns A and B) and then records or rows. FIG. 8 also shows two conventional histograms 810 and 820 created based on values stored in columns A and B, respectively. Note that the histogram 810 is identical to the histogram 710 since column A in table 800 is identical to column A in table 700. The histogram 820 is different from the histogram 720 since column B in table 800 has a different value distribution compared to column B in table 700.

FIG. 8 also shows two projection histograms: one projection histogram 830 from column A to column B, or PH(A→B), and another projection histogram 840 from column B to column A, or PH(B→A). As shown, the projection histogram 830 contains the base statistics of the column A and the projected statistics from column B. For instance, the base statistics of the column A include two intervals: [1, 1] and [2, 2], with respective row counts 4 and 6. For the first interval ([1, 1]), the projected statistics of column B include distinct value count 4 (e.g., 1, 2, 3, 4) and the range [1, 4]). For the second interval ([2, 2]), column B has three distinct values (e.g., 5, 6, 7) and the range [5, 7]. Similarly, the projection histogram 840 contains the base statistics of the column B and the projected statistics from column A. For instance, the base statistics of the column B include two intervals: [1, 4] and [5, 7], with respective row counts 4 and 6. For the first interval ([1, 4]), column A has only one distinct value (e.g., 1) with the range [1, 1]). For the second interval ([5, 7]), column A also has only one distinct value (e.g., 2) with the range [2, 2].

Figure 9:
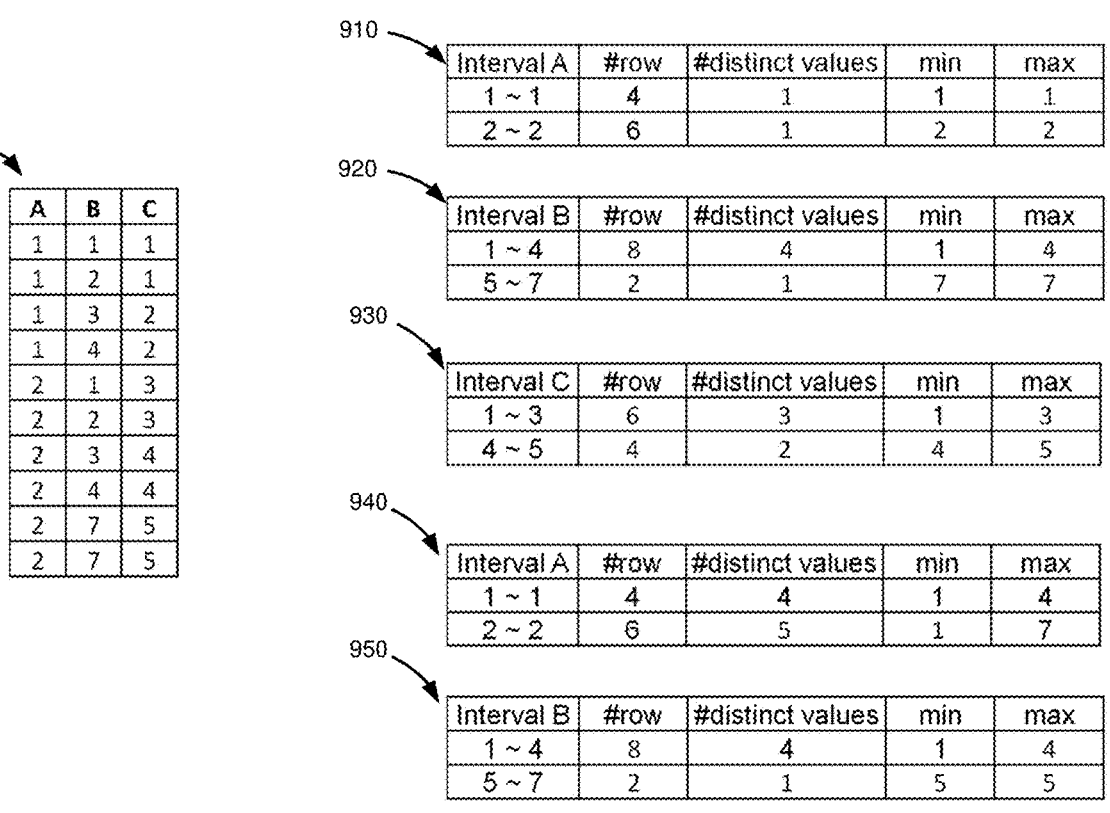
FIG. 9 depicts two projection histograms created based on three columns of yet another example database table.

As a further example, FIG. 9 shows a database table 900 having three columns (columns A, B, and C) and ten records or rows. For simplicity, columns A and B in table 900 is identical to the columns A and B in table 700. FIG. 9 also shows three conventional histograms 910, 920, and 930 created based on data values stored in columns A, B, and C, respectively. Due to identical column values, the histogram 910 is identical to the histogram 710, and the histogram 920 is identical to the histogram 720.

FIG. 9 also shows two projection histograms: one projection histogram 940 from column A to column B, or PH(A→B), and another projection histogram 950 from column B to column C, or PH(B→C). In this example, the projection histogram 940 is identical to the projection histogram 730. Likewise, the projection histogram 950 can be constructed to contain the base statistics of the column B and the projected statistics from column C. For instance, the base statistics of the column B include two intervals: [1, 4] and [5, 7], with respective row counts 8 and 2. For the first interval ([1, 4]), the projected statistics of column C include distinct value count 4 (e.g., 1, 2, 3, 4) and the range [1, 4]). For the second interval ([5, 7]), column C has only one distinct value (e.g., 5) and the range [5, 5].

Although not shown, additional projection histograms based on other permutations of source and target columns of table 900 can be similarly created, such as PH(A→C), PH(B→A), PH(C→A), and PH(C→B).

It should also be understood that the examples shown in FIG. 7 and FIG. 8 are merely for illustration purposes, and the depicted examples are non-limiting. For instance, a table can have any number of columns and/or rows, depending on the application. Additionally, the data values stored in each column can be of different data types, such as integers, floating-point numbers, strings, dates, or other types, which may impact how intervals and statistics are calculated. For example, intervals for a column containing dates might be based on date ranges (e.g., by month or year), while intervals for a column containing strings might involve alphabetical ranges or string length intervals.

In some examples, decimal types may be preferred over floating-point or double types, as floating-point types cannot guarantee the precision of fractions (e.g., 1.345599 may be rounded to 1.3456). Decimal types, which have defined precision and scale, can be stored using long integer values. For example, a column defined as "decimal (5, 2)" can have values like 123.45 and 123.56, and it is possible to determine the number of values that exist between them, similar to counting values between 12345 and 12356. Thus, different data types may be converted to decimal types for storage in database tables.

Example Use Cases of Filter Size Estimation for Conjunctive Predicates

Several use cases are described herein to illustrate query filter size estimation for conjunctive predicates.

In a first example, let's assume a query on the table 800 has a filter including two conjunctive predicates: A=1 and B>=5. The true output size of the filter is zero because no record satisfies both predicates. As noted above, conventional histograms 810 and 820 can be used to estimate the output size of the filter, assuming values in columns A and B are independent from each other. Specifically, the selectivity of each predicate can be calculated independently. For the predicate A=1, the selectivity is 4/10=0.4, based on the first interval [1, 1] in histogram 810. For the predicate B>=5, the selectivity is 6/10=0.6, based on the second interval [5, 7] in histogram 820. Multiplying these two selectivity values gives an estimated selectivity of 0.4*0.6=0.24, resulting in an over-estimated output size of 10*0.24=2.4 records (or rounded to 2).

As described above, the output size of the filter can be estimated using the projection histogram 830. First, a group size can be estimated based on evaluating the base statistics of the projection histogram 830 (step 510). Specifically, the first interval [1, 1] is determined as a matching interval which satisfies the first predicate A=1, with a corresponding row count 4 (step 512). The fraction of the matching interval in which values satisfy the first predicate is 100% (step 514) because the only value in the first interval, 1, satisfies the first predicate. The group size is 4, which is the adjusted row count (e.g., multiplying the row count by the fraction at step 516). The group size can be adjusted based on evaluating the projected statistics of the projection histogram 830 (step 520). Specifically, the range corresponding to the matching interval is [1, 4] (step 522). The fraction of the range in which values satisfies the second predicate B>=5 is 0% (step 524) because the maximum value of B is 4. Thus, multiplying the group size (4) by the fraction (0%) (step 526) can yield the estimated output size 0, which is accurate.

Similarly, the output size of the filter can also be estimated using the projection histogram 840. First, a group size can be estimated based on evaluating the base statistics of the projection histogram 840 (step 510). Specifically, the second interval [5, 7] is determined as a matching interval which satisfies the second predicate B>=5, with a corresponding row count 6 (step 512). The fraction of the matching interval in which values satisfy the first predicate is 100% (step 514) because all values in this interval satisfy the second predicate. The group size is 6, which is the adjusted row count (e.g., multiplying the row count by the fraction at step 516). The group size can be adjusted based on evaluating the projected statistics of the projection histogram 840 (step 520). Specifically, the range corresponding to the matching interval is [2, 2] (step 522). The fraction of the range in which values satisfies the first predicate A=1 is 0% (step 524) because the value of A is 2. Thus, multiplying the group size (6) by the fraction (0%) (step 526) can yield the same accurate result, that is, the estimated output size is 0.

In a second example, let's consider a query on the table 700 with a filter including two conjunctive predicates: A=1 and B<5. The true output size of the filter is 4 as the first four rows of the table 700 satisfy both predicates. The filter output size can be estimated using conventional histograms 710, 720. For example, for the predicate A=1, the selectivity is 4/10=0.4, based on the first interval [1, 1] in histogram 710. For the predicate B<5, the selectivity is 8/10=0.8, based on the first interval [1, 4] in histogram 720. Multiplying these two selectivity values gives an estimated selectivity of 0.4*0.8=0.32, resulting in an under-estimated output size of 10*0.32=3.2 records (or rounded to 3).

As described above, the output size of the filter can be estimated using the projection histogram 730. First, a group size can be estimated based on evaluating the base statistics of the projection histogram 730 (step 510). Specifically, the first interval [1, 1] is determined as a matching interval which satisfies the first predicate A=1, with a corresponding row count 4 (step 512). The fraction of the matching interval in which values satisfy the first predicate is 100% (step 514) because all values in this interval satisfy the first predicate. The group size is 4, which is the adjusted row count (e.g., multiplying the row count by the fraction at step 516). The group size can be adjusted based on evaluating the projected statistics of the projection histogram 730 (step 520). Specifically, the range corresponding to the matching interval is [1, 4] (step 522). The fraction of the range in which values satisfies the second predicate B<5 is 100% (step 524) because the maximum value of B in this range is 4. Thus, multiplying the group size (4) by the fraction (100%) (step 526) can yield an estimated output size 4, which is accurate.

Similarly, the output size of the filter can also be estimated using the projection histogram 740. First, a group size can be estimated based on evaluating the base statistics of the projection histogram 740 (step 510). Specifically, the first interval [1, 4] is determined as a matching interval which satisfies the second predicate B<5, with a corresponding row count 8 (step 512). The fraction of the matching interval in which values satisfy the first predicate can calculated to be 100% (step 514) because all values in this interval satisfy the second predicate. The group size is 8, which is the adjusted row count (e.g., multiplying the row count by the fraction at step 516). The group size can be adjusted based on evaluating the projected statistics of the projection histogram 740 (step 520). Specifically, the range corresponding to the matching interval is [1, 2] (step 522). The fraction of the range in which values satisfies the first predicate A=1 can be estimated to be 50% (step 524). For instance, assuming a uniform distribution of A in this interval, a linear estimator can be used to determine that half of the values in the range [1, 2] are ones, and the other half are twos. Thus, multiplying the group size (8) by the fraction (50%) (step 526) can yield the same accurate result, that is, the estimated output size is 4.

Example Use Cases of Projection Histogram Chaining for Conjunctive Predicates Additional examples are described herein to illustrate using projection histogram chaining to estimate output size of filters having more complex conjunctive predicates. For simplicity, examples of estimating filter output size using conventional histograms, which are shown above to be error prone, are omitted.

A first example considers a query on the table 900 with a filter including three conjunctive predicates: A=2 and B<5 and C>3. The true output size of the filter is 2 as only the 7th and 8th rows of the table 900 satisfy all three predicates. To estimate the output size through projection histogram chaining, a first selectivity for the first two conjunctive predicates (A=2 and B<5) can be determined based on evaluating the projection histogram 940, and a second selectivity for the latter two conjunctive predicates (B<5 and B>3) can be determined based on evaluating the projection histogram 950. The selectivity of the filter can be determined as the product of the first selectivity and the second selectivity.

To evaluate the first two conjunctive predicates (A=2 and B<5), a group size can be estimated based on evaluating the base statistics of the projection histogram 940 (step 510). Specifically, the second interval [2, 2] is determined as a matching interval which satisfies the first predicate A=2, with a corresponding row count 6 (step 512). The fraction of the matching interval in which values satisfy the first predicate is 100% (step 514) because the only value in this interval is 2. The group size is 6, which is the adjusted row count (e.g., multiplying the row count by the fraction at step 516). The group size can be adjusted based on evaluating the projected statistics of the projection histogram 940 (step 520). Specifically, the range corresponding to the matching interval is [1, 7] (step 522). The fraction of the range in which values satisfies the predicate B<5 can be estimated to be 4/7 (step 524), assuming values are uniformly distributed in this range. For example, the cutoff threshold of the predicate B<5 indicates that only a portion of the values in the range [1, 7] meet the condition, and a linear estimator can be used to estimate the fraction as (5−1)/(7−1+1), which results in 4/7. Thus, multiplying the group size (6) by the fraction (4/7) (step 526) can yield an adjusted group size 3.43, and the corresponding first selectivity can be determined to be 3.43/10=0.343.

To evaluate the second pair of conjunctive predicates (B<5 and C>3), a group size can be estimated based on evaluating the base statistics of the projection histogram 950 (step 510). Specifically, the first interval [1, 4] is determined as a matching interval which satisfies the predicate B<5, with a corresponding row count 8 (step 512). The fraction of the matching interval in which values satisfy this predicate is 100% (step 514) because all values in this interval are less than 5. The group size is 8, which is the adjusted row count (e.g., multiplying the row count by the fraction at step 516). The group size can be adjusted based on evaluating the projected statistics of the projection histogram 950 (step 520). Specifically, the range corresponding to the matching interval is [1, 4] (step 522). The fraction of the range in which values satisfies the predicate C>3 can be estimated to be 1/4 (step 524), assuming values are uniformly distributed in this range. For example, the cutoff threshold of the predicate C>3 indicates that only a portion of the values in the range [1, 4] meet the condition, and a linear estimator can be used to estimate the fraction as (4−3)/(4−1+1), which results in 1/4. Thus, multiplying the group size (8) by the fraction (1/4) (step 526) can yield an adjusted group size 2, and the corresponding second selectivity can be determined to be 2/10=0.2.

As such, the selectivity of the filter can be calculated as the product of the first selectivity and the second selectivity (0.343*0.2=0.0686), and the output size of the filter can be estimated to be 10*0.0686=0.686 (or rounded to 1). Although the estimated filter output size is not equal to the true output size of 2, it is relatively close.

A second example considers a query on the table 900 with a filter including three conjunctive predicates: A=2 and B<6 and C>3. The true output size of the filter is still 2.

Similarly, to evaluate the first two conjunctive predicates (A=2 and B<6), the base statistics of the projection histogram 940 can be analyzed (step 510). Specifically, the second interval [2, 2] is determined as a matching interval which satisfies the first predicate A=2, with a corresponding row count 6 (step 512). The fraction of the matching interval in which values satisfy the first predicate is 100% (step 514) because the only value in this interval is 2. The group size is 6, which is the adjusted row count (e.g., multiplying the row count by the fraction at step 516). The group size can be adjusted based on evaluating the projected statistics of the projection histogram 940 (step 520). Specifically, the range corresponding to the matching interval is [1, 7] (step 522). The fraction of the range in which values satisfies the predicate B<5 can be estimated to be 5/7 (step 524), assuming values are uniformly distributed in this range. For example, the cutoff threshold of the predicate B<6 indicates that only a portion of the values in the range [1, 7] meet the condition, and a linear estimator can be used to estimate the fraction as (6−1)/(7−1+1), which results in 5/7. Thus, multiplying the group size (6) by the fraction (5/7) (step 526) can yield an adjusted group size 4.29, and the corresponding first selectivity can be determined to be 4.29/10=0.429.

To evaluate the second pair of conjunctive predicates (B<6 and C>3), the base statistics of the projection histogram 950 can be analyzed (step 510). Specifically, the first interval [1, 4] is determined as a matching interval which satisfies the predicate B<6, with a corresponding row count 8 (step 512). The fraction of the matching interval in which values satisfy this predicate is 100% (step 514) because all values in this interval are less than 6. The adjusted row count (denoted as the "first group size") for the first interval is thus 8*100%=8 (step 516). Additionally, the second interval [5, 7] can also be deemed as a matching interval (with a corresponding row count 2) because at least some values in the interval can be less than 6 (step 512). The fraction of the second interval satisfying the predicate B<6 can be estimated to be 1/3 (step 514), assuming values are uniformly distributed in this interval (e.g., using a linear estimator as described above). The adjusted row count (denoted as the "second group size") for the second interval is thus 2*1/3=0.66 (step 516). The first and second group sizes can be further adjusted based on evaluating the projected statistics of the projection histogram 950 (step 520). Specifically, the range corresponding to the first matching interval is [1, 4] (step 522). The fraction of the range in which values satisfies the predicate C>3 can be estimated to be 1/4 (step 524), as described above. Thus, the adjusted first group size is 8*1/4=2 (step 526). The range corresponding to the second matching interval is [5, 5] (step 522). The fraction of the range in which values satisfy the predicate C>3 is 100% because the only value in this range is 5 (step 524). Thus, the adjusted second group size is 0.66*100%=0.66 (step 526). The overall group size is the sum of the two adjusted group sizes, that is, 2+0.66=2.66. Thus, the second selectivity can be determined as 2.66/10=0.266.

As such, the selectivity of the filter can be calculated as the product of the first selectivity and the second selectivity (0.429*0.266=0.113), and the output size of the filter can be estimated to be 10*0.113=1.13 (or rounded to 1).

In the above two examples, the output size of the filter with three conjunctive predicates is determined by chaining the projection histogram 940 (PH(A→B)) with projection histogram 950 (PH(B→C)). It should be understood that the same method can be used to estimate the output size of the filter by chaining other projection histograms, such as chaining PH(A→C) and PH(C→B), or chaining PH(B→A) and PH(A→C), or chaining PH(C→A) and PH(C→B), and so on, so long as the target column of the first projection histogram is the same as the source column of the second projection histogram.

Further, although in the depicted examples, the filter includes three conjunctive predicates, it should be understood that the projection histogram chaining method described herein can be applied to estimate output size of filters including more than three conjunctive predicates. Specifically, a selectivity value can be determined for each projection histogram in the chain as described above, and the overall selectivity of the filter can be calculated as the product of all selectivity values obtained from all projection histograms. The output size of the filter can then be determined based on the calculated overall selectivity.

Example Use Cases of Filter Size Estimation for Disjunctive Predicates

Several use cases are described herein to illustrate query filter size estimation for disjunctive predicates.

In a first example, let's assume a query on the table 800 has a filter including two disjunctive predicates: A=1 or B<5. The true output size of the filter is 4 (the first four rows satisfy one of the two predicates). As noted above, conventional histograms 810 and 820 can be used to estimate the output size of the filter, assuming columns A and B contain independent attributes. Specifically, the selectivity of each predicate can be calculated independently. For the predicate A=1, the selectivity is 4/10=0.4, based on the first interval [1, 1] in histogram 810. For the predicate B<5, the selectivity is 4/10=0.4, based on the first interval [1, 4] in histogram 820. Assuming independency between columns A and B, the estimated selectivity of the filter can be calculated using the union formula, (A∪B)=A+B−(A∩B), that is, 0.4+0.4−0.4*0.4=0.64, resulting in an over-estimated output size of 10*0.64=6.4 records (or rounded to 6).

As described above, the output size of the filter can be estimated using the projection histogram 830. First, a first group size can be estimated based on evaluating the base statistics of the projection histogram 830 (step 610). Specifically, the first interval [1, 1] is determined as a matching interval satisfying the first predicate A=1, with a corresponding row count 4 (step 612). The fraction of the matching interval in which values satisfy this predicate is 100% (step 614) because the only value in the first interval is 1. The first group size is 4, which is the adjusted row count (e.g., the product of the row count and the fraction at step 616). A second group size can be determined based on both the base statistics and the projected statistics of the projection histogram 830 (step 620). Specifically, the second interval [2, 2] is deemed to be a non-matching interval (step 622) with the row count 6.

Because the only value in this interval is 2, the fraction of the second interval in which values do not meet the first predicate is determined to be 100% (step 624). The non-matching count can be calculated as 6*100%=6 (step 626). The range corresponding to the second interval is [5, 7] (step 628). The fraction of the range in which values satisfies the second predicate B<5 is 0% (step 630) because the minimum value of B is 5. The second group size can be calculated as the product of the non-matching count (6) and the fraction (0%), which yields 0 (step 632). Thus, the estimated output size is the sum of the first group size (4) and the second group size (0), i.e., 4, which is accurate.

Without repeating the calculation steps described above, the output size of the filter can also be estimated using the projection histogram 840, which can obtain the same accurate result.

In a second example, let's consider a query on the table 700 with a filter including two disjunctive predicates: A=1 or B<5. The true output size of the filter is 8 as the first eight rows of the table 700 satisfy one or the two predicates. The filter output size can be estimated using conventional histograms 710, 720. For example, for the predicate A=1, the selectivity is 4/10=0.4, based on the first interval [1, 1] in histogram 710. For the predicate B<5, the selectivity is 8/10=0.8, based on the first interval [1, 4] in histogram 720.

Assuming independency between columns A and B, the estimated selectivity of the filter can be calculated using the union formula, 0.4+0.8–0.4*0.8=0.88, and the estimated output size of 10*0.88=8.8 records (or rounded to 9).

Similarly, the output size of the filter can be estimated using the projection histogram 730. First, a first group size can be estimated by evaluating the base statistics of the projection histogram 730 (step 610). Specifically, the first interval [1, 1] is determined as a matching interval satisfying the first predicate A=1, with a corresponding row count 4 (step 712). The fraction of the matching interval in which values satisfy this predicate is 100% (step 614) because the only value in the first interval is 1. The first group size is 4, which is the adjusted row count (e.g., the product of the row count and the fraction at step 616). A second group size can be determined based on both the base statistics and the projected statistics of the projection histogram 730 (step 620). Specifically, the second interval [2, 2] is deemed to be a non-matching interval (step 622) with the row count 6. The fraction of the second interval in which values do not meet the first predicate is 100% (step 624). The non-matching count can be calculated as 6*100%=6 (step 626). The range corresponding to the second interval is [1, 7] (step 628). The fraction of the range in which values satisfies the second predicate B<5 is estimated to be 4/7 (step 630), assuming values are uniformly distributed in this interval (e.g., using a linear estimator as described above). The second group size can be calculated as the product of the non-matching count (6) and the fraction (4/7), which yields 3.43 (step 632). Thus, the estimated output size is the sum of the first group size (4) and the second group size (3.43), which is 7.43 (or rounded to 7). Although the estimated filter output size is not equal to the true output size of 8, it is relatively close.

Without repeating the calculation steps described above, the output size of the filter can also be estimated using the projection histogram 740. In this case, the calculated first group size is 8, and the second group size is 0. As a result, the estimated filter output size is 8, which is accurate.

Example Use Cases of Projection Histogram Chaining for Disjunctive Predicates

Additional examples are described herein to illustrate using projection histogram chaining to estimate output size of filters having more complex disjunctive predicates. For simplicity, examples of estimating filter output size using conventional histograms, which are known to be error prone, are omitted.

A first example considers a query on the table 900 with a filter including three disjunctive predicates: A=1 or B<3 and C>4. The true output size of the filter is 8 as all records except the 7th and 8th rows of the table 900 satisfy at least one of three predicates. To estimate the output size through projection histogram chaining, two projection histograms 940 and 950 can be analyzed sequentially. As described above, analyzing the projection histogram 940 (to evaluate the first two predicates: A=1 or B<3) can generate a first group size and a second group size. The first group size represents the count of rows in column A that satisfy the predicate A=1. The second group size reflects the count of rows that meet the predicate B<3 but excludes any rows that already meet the predicate A=1. Analyzing the projection histogram 950 (to evaluate the latter two predicates: B<3 or C>4) can yield a third group size, which represents the count of rows that meet the predicate C>4 but excludes any rows that already meet the predicate B<3. The output size of the filter can be calculated as the sum of the first, second, and third group sizes.

Starting with the projection histogram 940, the first group size can be estimated based on evaluating its base statistics (step 610). Specifically, the first interval [1, 1] is determined as a matching interval satisfying the first predicate A=1, with a corresponding row count 4 (step 612). The fraction of the matching interval in which values satisfy this predicate is 100% (step 614). The first group size is thus 4, calculated as the product of the row count and the fraction (step 616). The second group size can be determined based on both the base statistics and the projected statistics of the projection histogram 940 (step 620). Specifically, the second interval [2, 2] is deemed as a non-matching interval (step 622) with the row count 6. The fraction of the second interval in which values do not meet the first predicate is 100% (step 624). The non-matching count can be calculated as 6*100%=6 (step 626). The range corresponding to the second interval is [1, 7] (step 628). The fraction of the range in which values satisfies the predicate B<3 is 2/7 (step 630), assuming values are uniformly distributed in this range (e.g., using a linear estimator as described above). The second group size can be calculated as the product of the non-matching count (6) and the fraction (2/7), which yields 1.7 (step 632).

Turning to the second projection histogram 950, the third group size can be estimated based on both the base statistics and the projected statistics (step 620). The first interval [1, 4] can be deemed as a non-matching interval with the row count 8 because some values in the interval (e.g., 3, 4) do not satisfy the predicate B<3 (step 622). The fraction of this interval in which values do not meet the predicate B<3 can be estimated to be 1/2 (step 624), assuming values are uniformly distributed in this interval (e.g., using a linear estimator as described above). The non-matching count can be calculated as 8*1/2=4 (step 626). The range corresponding to the first interval is [1, 4] (step 628). The fraction of the range in which values satisfies the predicate C>4 is 0% (step 630) because the maximum value of the range is 4. Thus, the adjusted row count is 4*0%=0 for the first interval. The second interval [5, 7] is also a non-matching interval with the row count 2 (step 622) because none of the values in this interval satisfy the predicate B<3. The fraction of this interval in which values do not meet the predicate B<3 is 100% (step 624). The non-matching count can be calculated as 2*100%=2 (step 626). The range corresponding to the second interval is [5, 5] (step 628). The fraction of the range in which values satisfies the predicate C>4 is 100% (step 630) because the minimum value of the range is 5. Thus, the adjusted row count is 2*100%=2 for the second interval, and the third group size can be calculated as the sum of the two adjusted row counts, 0+2=2 (step 632). The output size of the filter can be calculated as the sum of the first, second, and third group sizes, i.e., 4+1.7+2=7.7 (or rounded to 8).

A second example considers a query on the table 900 with a filter including three disjunctive predicates: A=1 or B<6 and C>4. The true output size of the filter is 10 as all records satisfy at least one of three predicates. Similarly, the projection histograms 940 and 950 can be analyzed sequentially to estimate the output size of the filter.

Starting with the projection histogram 940, the first group size can be calculated to be 4, following the same steps 612-616 described above. Similarly, the second interval [2, 2] is deemed as a non-matching interval with the row count 6 (step 622), and the fraction of the second interval in which values do not meet the predicate A=1 is 100% (step 624). The non-matching count can be calculated as 6*100%=6 (step 626). The range corresponding to the second interval is [1, 7] (step 628). In this example, the fraction of the range in which values satisfies the predicate B<6 is 5/7 (step 630), assuming values are uniformly distributed in this range (e.g., using a linear estimator as described above). The second group size can be calculated as the 6*5/7=4.3 (step 632).

Turning to the second projection histogram 950, The first interval [1, 4] is a matching interval because all values in the interval satisfy the predicate B<6, so it is excluded from consideration. The second interval [5, 7] is a non-matching interval with the row count 2 (step 622) because some values in this interval (e.g., 6, 7) do not meet the predicate B<6. The fraction of this interval in which values do not meet the predicate B<6 can be estimated to be 2/3 (step 624), assuming values are uniformly distributed in this interval (e.g., using a linear estimator as described above). The non-matching count can be calculated as 2*2/3=1.33 (step 626). The range corresponding to the second interval is [5, 5] (step 628). The fraction of the range in which values satisfies the predicate C>4 is 100% (step 630). Thus, the adjusted row count is 1.33*100%=1.33 for the second interval, which is also the third group size because the second interval is the only non-matching interval (step 632). The output size of the filter can be calculated as the sum of the first, second, and third group sizes, i.e., 4+4.3+1.33=9.63 (or rounded to 10).

In the above two examples, the output size of the filter with three disjunctive predicates is determined by chaining the projection histogram 940 (PH(A→B)) with projection histogram 950 (PH(B→C)). It should be understood that the same method can be used to estimate the output size of the filter by chaining other projection histograms, such as chaining PH(A→C) and PH(C→B), or chaining PH(B→A) and PH(A→C), or chaining PH(C→A) and PH(C→B), and so on, so long as the target column of the first projection histogram is the same as the source column of the second projection histogram.

Further, although in the depicted examples, the filter includes three disjunctive predicates, it should be understood that the projection histogram chaining method described herein can be applied to estimate output size of filters including more than three disjunctive predicates.

Specifically, each additional projection histogram can be used to determine a new group size for each new predicate, while excluding any rows that satisfy any previous predicate. The output size of the filter can then be calculated as the sum of the group sizes determined from all projection histograms.

Example Use Cases of Output Size Estimation for Group-by Clauses

Besides estimating filter output size, the statistics information contained in the projection histograms can also be used for other aspects of the query optimization process. For example, the distinct value counts contained in the projection histograms can be used to estimate the output size of a group-by clause of the query.

Considering the following query statement (assume T1 is table 700):

SELECT B, AVG (C) FROM T1 WHERE A=1 GROUP BY B

In this example, the projection histogram 730 can be used to estimate the output size of the GROUP BY B clause in the query. Since the query filters rows where A=1, the first interval [1, 1] the projection histogram 730 is selected as a matching interval. This interval indicates that there are 4 distinct values of B (for rows meeting the predicate A=1) distributed in the range [1, 4]. As a result, the estimated output size of the GROUP BY B clause is 4.

When multiple intervals are matching intervals, the distinct value counts of these intervals can be combined to estimate the output size of the group-by clause. For example, consider the following query statement (assume T1 is table 700):

SELECT B, AVG (C) FROM T1 GROUP BY B

In this example, both the first interval [1, 1] and second interval [2, 2] of the projection histogram 730 qualify as matching intervals since column A is not filtered. The first interval indicates 4 distinct values of B distributed across the range [1, 4], and the second interval indicates 5 distinct values of B distributed across the range [1, 7]. Assuming values in the range [1, 7] are uniformly distributed, it can be estimated that there are 4 distinct values between 1 and 4, but only one distinct value between 5 and 7. Thus, it can be estimated that there are a total of 5 distinct values of B, and the output size of the GROUP BY B clause is 5.

Example Advantages

The technologies described herein offer several technical advantages.

First, the technologies disclosed herein can more accurately estimate filter output size (and the output size of group-by clauses) compared to traditional methods that use conventional histograms. As described above, conventional estimation techniques typically assume column independence, allowing the query optimizer to analyze each column's statistics in isolation and combine the results. However, this approach is prone to significant errors when columns are correlated, as it fails to capture relationships between column values. The disclosed approach, which utilizes projection histograms, instead incorporates inter-column relationships into its estimations, thereby can generate more precise output size estimates.

While multi-dimensional histograms can be theoretically used to capture inter-column dependencies for more accurate filter size estimation, they present significant challenges in practice. As the number of columns increases, the data space required for a multi-dimensional histogram grows exponentially, leading to substantial storage requirements and increased computational overhead. In contrast, the disclosed approach using projection histograms and histogram chaining effectively models inter-column relationships without the memory and processing demands associated with multi-dimensional histograms. Using projection histograms and chaining them as needed, the disclosed technologies can achieve similar accuracy in filter size estimation while maintaining efficiency and scalability.

Further, the technologies described herein facilitate the efficient handling of complex filters involving multiple conjunctive or disjunctive predicates through histogram chaining, which entails the sequential evaluation of individual projection histograms. This approach enhances flexibility by enabling the use of various combinations of available projection histograms tailored to specific query requirements, while also allowing for the on-demand creation of specific projection histograms as needed.

Example Computing Systems

Figure 10:
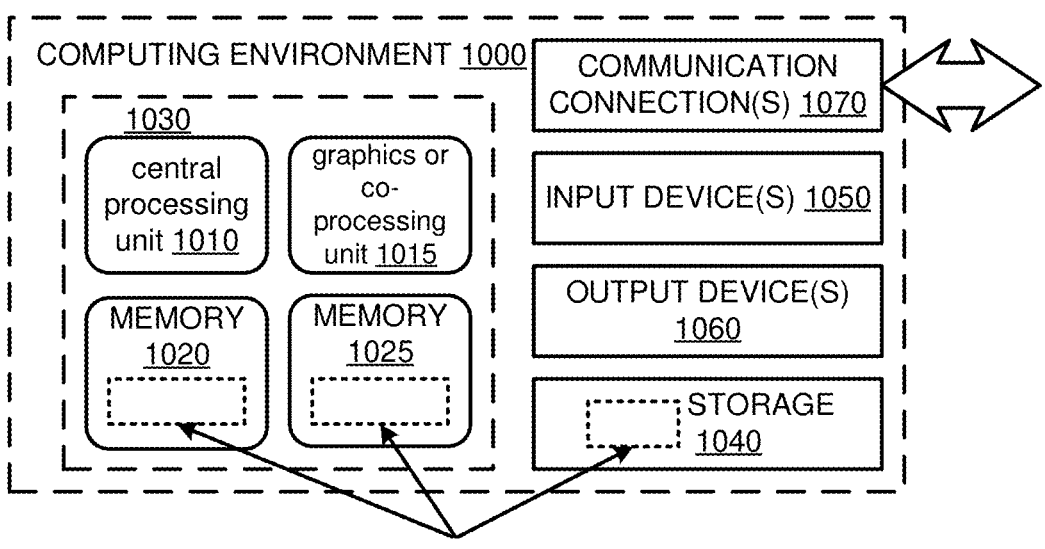
FIG. 10 is a block diagram of an example computing system in which described embodiments can be implemented.

FIG. 10 depicts an example of a suitable computing system 1000 in which the described innovations can be implemented. The computing system 1000 is not intended to suggest any limitation as to scope of use or functionality of the present disclosure, as the innovations can be implemented in diverse computing systems.

With reference to FIG. 10, the computing system 1000 includes one or more processing units 1010, 1015 and memory 1020, 1025. In FIG. 10, this basic configuration 1030 is included within a dashed line. The processing units 1010, 1015 can execute computer-executable instructions, such as for implementing the features described in the examples herein (e.g., the methods 400, 500, and 600). A processing unit can be a general-purpose central processing unit (CPU), processor in an application-specific integrated circuit (ASIC), or any other type of processor. In a multiprocessing system, multiple processing units can execute computer-executable instructions to increase processing power. For example, FIG. 10 shows a central processing unit 1010 as well as a graphics processing unit or co-processing unit 1015. The tangible memory 1020, 1025 can be volatile memory (e.g., registers, cache, RAM), non-volatile memory (e.g., ROM, EEPROM, flash memory, etc.), or some combination of the two, accessible by the processing unit(s) 1010, 1015. The memory 1020, 1025 can store software 1080 implementing one or more innovations described herein, in the form of computer-executable instructions suitable for execution by the processing unit(s) 1010, 1015.

A computing system 1000 can have additional features. For example, the computing system 1000 can include storage 1040, one or more input devices 1050, one or more output devices 1060, and one or more communication connections 1070, including input devices, output devices, and communication connections for interacting with a user. An interconnection mechanism (not shown) such as a bus, controller, or network can interconnect the components of the computing system 1000. Typically, operating system software (not shown) can provide an operating environment for other software executing in the computing system 1000, and coordinate activities of the components of the computing system 1000.

The tangible storage 1040 can be removable or non-removable, and includes magnetic disks, magnetic tapes or cassettes, CD-ROMs, DVDs, or any other medium which can be used to store information in a non-transitory way and which can be accessed within the computing system 1000. The storage 1040 can store instructions for the software implementing one or more innovations described herein.

The input device(s) 1050 can be an input device such as a keyboard, mouse, pen, or trackball, a voice input device, a scanning device, touch device (e.g., touchpad, display, or the like) or another device that provides input to the computing system 1000. The output device(s) 1060 can be a display, printer, speaker, CD-writer, or another device that provides output from the computing system 1000.

The communication connection(s) 1070 can enable communication over a communication medium to another computing entity. The communication medium can convey information such as computer-executable instructions, audio or video input or output, or other data in a modulated data signal. A modulated data signal is a signal that has one or more of its characteristics set or changed in such a manner as to encode information in the signal. By way of example, and not limitation, communication media can use an electrical, optical, RF, or other carrier.

The innovations can be described in the context of computer-executable instructions, such as those included in program modules, being executed in a computing system on a target real or virtual processor (e.g., which is ultimately executed on one or more hardware processors). Generally, program modules or components can include routines, programs, libraries, objects, classes, components, data structures, etc. that perform particular tasks or implement particular abstract data types. The functionality of the program modules can be combined or split between program modules as desired in various embodiments. Computer-executable instructions for program modules can be executed within a local or distributed computing system.

For the sake of presentation, the detailed description uses terms like "determine" and "use" to describe computer operations in a computing system. These terms are high-level descriptions for operations performed by a computer, and should not be confused with acts performed by a human being. The actual computer operations corresponding to these terms vary depending on implementation.

Computer-Readable Media

Any of the computer-readable media herein can be non-transitory (e.g., volatile memory such as DRAM or SRAM, nonvolatile memory such as magnetic storage, optical storage, or the like) and/or tangible. Any of the storing actions described herein can be implemented by storing in one or more computer-readable media (e.g., computer-readable storage media or other tangible media). Any of the things (e.g., data created and used during implementation) described as stored can be stored in one or more computer-readable media (e.g., computer-readable storage media or other tangible media). Computer-readable media can be limited to implementations not consisting of a signal.

Any of the methods described herein can be implemented by computer-executable instructions in (e.g., stored on, encoded on, or the like) one or more computer-readable media (e.g., computer-readable storage media or other tangible media) or one or more computer-readable storage devices (e.g., memory, magnetic storage, optical storage, or the like). Such instructions can cause a computing device to perform the method. The technologies described herein can be implemented in a variety of programming languages.

Example Cloud Computing Environment

Figure 11:
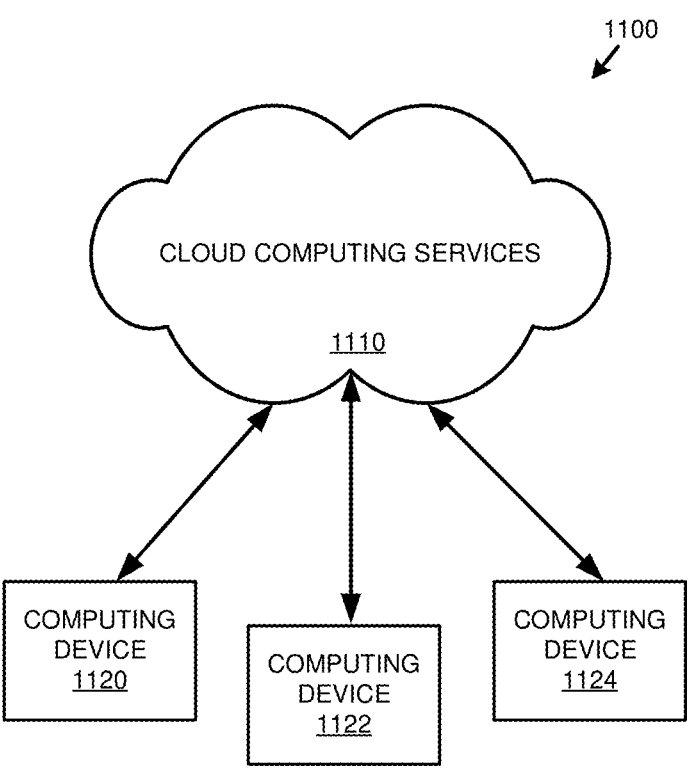
FIG. 11 is a block diagram of an example cloud computing environment that can be used in conjunction with the technologies described herein.

FIG. 11 depicts an example cloud computing environment 1100 in which the described technologies can be implemented, including, e.g., the system 200 and other systems herein. The cloud computing environment 1100 can include cloud computing services 1110. The cloud computing services 1110 can comprise various types of cloud computing resources, such as computer servers, data storage repositories, networking resources, etc. The cloud computing services 1110 can be centrally located (e.g., provided by a data center of a business or organization) or distributed (e.g., provided by various computing resources located at different locations, such as different data centers and/or located in different cities or countries).

The cloud computing services 1110 can be utilized by various types of computing devices (e.g., client computing devices), such as computing devices 1120, 1122, and 1124. For example, the computing devices (e.g., 1120, 1122, and 1124) can be computers (e.g., desktop or laptop computers), mobile devices (e.g., tablet computers or smart phones), or other types of computing devices. For example, the computing devices (e.g., 1120, 1122, and 1124) can utilize the cloud computing services 1110 to perform computing operations (e.g., data processing, data storage, and the like).

In practice, cloud-based, on-premises-based, or hybrid scenarios can be supported.

Example Implementations

Although the operations of some of the disclosed methods are described in a particular, sequential order for convenient presentation, such manner of description encompasses rearrangement, unless a particular ordering is required by specific language set forth herein. For example, operations described sequentially can in some cases be rearranged or performed concurrently.

As described in this application and in the claims, the singular forms "a," "an," and "the" include the plural forms unless the context clearly dictates otherwise. Additionally, the term "includes" means "comprises." Further, "and/or" means "and" or "or," as well as "and" and "or."

Example Clauses

Any of the following example clauses can be implemented.

Clause 1. A computer-implemented method, comprising: receiving a query for a database table, wherein the query has a filter comprising a first predicate and a second predicate, wherein the first predicate specifies a first condition evaluating values in a first column of the database table and the second predicate specifies a second condition evaluating values in a second column of the database table; obtaining a projection histogram comprising base statistics of the first column and projected statistics of the second column; and determining an output size of the filter based on the projection histogram, wherein the base statistics of the first column comprise a plurality of intervals and respective counts of cells in the first column whose values are within corresponding intervals, wherein a selected interval defines a set of rows containing a first set of cells in the first column whose values are within the selected interval, wherein the projected statistics of the second column comprise a plurality of ranges corresponding to the plurality of intervals, respectively, wherein the set of rows defined by the selected interval contains a second set of cells in the second column, wherein a range corresponding to the selected interval is defined by a minimum and a maximum of values in the second set of cells.

Clause 2. The method of clause 1, wherein the first predicate and the second predicate have a conjunctive relationship, wherein determining the output size of the filter comprises: determining a group size based on evaluating the base statistics of the projection histogram using the first condition; and adjusting the group size based on evaluating the projected statistics of the projection histogram using the second condition.

Clause 3. The method of clause 2, wherein determining the group size comprises: identifying a matching interval in the projection histogram which contains at least some values in the first column that meet the first condition and a count corresponding to the matching interval; determining a fraction of the matching interval in which values meet the first condition; and multiplying the count by the fraction of the matching interval.

Clause 4. The method of clause 3, wherein adjusting the group size comprises: identifying a range corresponding to the matching interval; determining a fraction of the range in which values meet the second condition; and multiplying the group size by the fraction of the range.

Clause 5. The method of any one of clauses 3-4, wherein the matching interval is one of a plurality of matching intervals, wherein the plurality of matching intervals has corresponding adjusted group sizes, wherein determining the output size of the filter further comprises summing the adjusted group sizes corresponding to the plurality of matching intervals.

Clause 6. The method of any one of clauses 2-5, wherein the filter further comprises a third predicate which specifies a third condition evaluating values in a third column of the database table, wherein the second predicate and the third predicate also have a conjunctive relationship, wherein the project histogram is a first projection histogram, wherein the group size is a first group size, wherein determining the output size of the filter further comprises: obtaining a second projection histogram comprising base statistics of the second column and projected statistics of the third column; determining a second group size based on evaluating the base statistics of the second projection histogram using the second condition; adjusting the second group size based on evaluating the projected statistics of the second projection histogram using the third condition; determining a first selectivity as a ratio of the first group size to a total number of rows in the database table; determining a second selectivity as a ratio of the second group size to the total number of rows in the database table; and determining a product of the first selectivity and the second selectivity.

Clause 7. The method of any one of clauses 1-6, wherein the first predicate and the second predicate have a disjunctive relationship, wherein determining the output size of the filter comprises: determining a first group size based on evaluating the base statistics of the projection histogram using the first condition; determining a second group size based on evaluating both the base statistics of the projection histogram using the first condition and the projected statistics of the projection histogram using the second condition; and calculating a sum of the first group size and the second group size.

Clause 8. The method of clause 7, wherein determining the first group size comprises: identifying one or more matching intervals in the projection histogram which contain at least some values in the first column that meet the first condition and respective counts corresponding to the one or more matching intervals; determining respective fractions of the one or more matching intervals in which values meet the first condition; and calculating a sum of products of the counts and their respective fractions of the one or more matching intervals.

Clause 9. The method of clause 8, wherein determining the second group size comprises: identifying one or more non-matching intervals in the projection histogram which contain at least some values in the first column that do not meet the first condition and respective counts corresponding to the one or more non-matching intervals; determining respective fractions of the one or more non-matching intervals in which values do not meet the first condition; calculating non-matching counts as products of the counts and their respective fractions of the one or more non-matching intervals; identifying one or more ranges corresponding to the one or more non-matching intervals, respectively; determining respective fractions of the one or more ranges in which values meet the second condition; and calculating a sum of products of the non-matching counts and their respective fractions of the one or more ranges.

Clause 10. The method of clause 9, wherein the filter further comprises a third predicate which specifies a third condition evaluating values in a third column of the database table, wherein the second predicate and the third predicate also have a disjunctive relationship, wherein the projection histogram is a first projection histogram, wherein the one or more non-matching intervals are first non-matching intervals, the one or more ranges are first ranges, and the non-matching counts are first non-matching counts, wherein determining the output size of the filter further comprises: obtaining a second projection histogram comprising base statistics of the second column and projected statistics of the third column; determining a third group size based on evaluating both the base statistics of the second projection histogram using the second condition and the projected statistics of the second projection histogram using the third condition; and adding the third group size to the sum of the first group size and the second group size, wherein determining the third group size comprises: identifying one or more second non-matching intervals in the second projection histogram which contain at least some values in the second column that do not meet the second condition and respective counts corresponding to the one or more second non-matching intervals; determining respective fractions of the one or more second non-matching intervals in which values do not meet the second condition; calculating second non-matching counts as products of the counts and their respective fractions of the one or more second non-matching intervals; identifying one or more second ranges corresponding to the one or more second non-matching intervals, respectively; determining respective fractions of the one or more second ranges in which values meet the third condition; and calculating a sum of products of the second non-matching counts and their respective fractions of the one or more second ranges.

Clause 11. A computing system, comprising: memory; one or more hardware processors coupled to the memory; and one or more non-transitory computer-readable media storing instructions that, when loaded into the memory, cause the one or more hardware processors to perform operations comprising: receiving a query for a database table, wherein the query has a filter comprising a first predicate and a second predicate, wherein the first predicate specifies a first condition evaluating values in a first column of the database table and the second predicate specifies a second condition evaluating values in a second column of the database table; obtaining a projection histogram comprising base statistics of the first column and projected statistics of the second column; and determining an output size of the filter based on the projection histogram, wherein the base statistics of the first column comprise a plurality of intervals and respective counts of cells in the first column whose values are within corresponding intervals, wherein a selected interval defines a set of rows containing a first set of cells in the first column whose values are within the selected interval, wherein the projected statistics of the second column comprise a plurality of ranges corresponding to the plurality of intervals, respectively, wherein the set of rows defined by the selected interval contains a second set of cells in the second column, wherein a range corresponding to the selected interval is defined by a minimum and a maximum of values in the second set of cells.

Clause 12. The system of clause 11, wherein the first predicate and the second predicate have a conjunctive relationship, wherein determining the output size of the filter comprises: determining a group size based on evaluating the base statistics of the projection histogram using the first condition; and adjusting the group size based on evaluating the projected statistics of the projection histogram using the second condition.

Clause 13. The system of clause 12, wherein determining the group size comprises: identifying a matching interval in the projection histogram which contains at least some values in the first column that meet the first condition and a count corresponding to the matching interval; determining a fraction of the matching interval in which values meet the first condition; and multiplying the count by the fraction of the matching interval.

Clause 14. The system of clause 13, wherein adjusting the group size comprises: identifying a range corresponding to the matching interval; determining a fraction of the range in which values meet the second condition; and multiplying the group size by the fraction of the range.

Clause 15. The system of any one of clauses 13-14, wherein the matching interval is one of a plurality of matching intervals, wherein the plurality of matching intervals has corresponding adjusted group sizes, wherein determining the output size of the filter further comprises summing the adjusted group sizes corresponding to the plurality of matching intervals.

Clause 16. The system of any one of clauses 12-15, wherein the filter further comprises a third predicate which specifies a third condition evaluating values in a third column of the database table, wherein the second predicate and the third predicate also have a conjunctive relationship, wherein the project histogram is a first projection histogram, wherein the group size is a first group size, wherein determining the output size of the filter further comprises: obtaining a second projection histogram comprising base statistics of the second column and projected statistics of the third column; determining a second group size based on evaluating the base statistics of the second projection histogram using the second condition; adjusting the second group size based on evaluating the projected statistics of the second projection histogram using the third condition; determining a first selectivity as a ratio of the first group size to a total number of rows in the database table; determining a second selectivity as a ratio of the second group size to the total number of rows in the database table; and determining a product of the first selectivity and the second selectivity.

Clause 17. The system of any one of clauses 11-16, wherein the first predicate and the second predicate have a disjunctive relationship, wherein determining the output size of the filter comprises: determining a first group size based on evaluating the base statistics of the projection histogram using the first condition; determining a second group size based on evaluating both the base statistics of the projection histogram using the first condition and the projected statistics of the projection histogram using the second condition; and calculating a sum of the first group size and the second group size.

Clause 18. The system of clause 17, wherein determining the first group size comprises: identifying one or more matching intervals in the projection histogram which contain at least some values in the first column that meet the first condition and respective counts corresponding to the one or more matching intervals; determining respective fractions of the one or more matching intervals in which values meet the first condition; and calculating a sum of products of the counts and their respective fractions of the one or more matching intervals.

Clause 19. The system of clause 18, wherein determining the second group size comprises: identifying one or more non-matching intervals in the projection histogram which contain at least some values in the first column that do not meet the first condition and respective counts corresponding to the one or more non-matching intervals; determining respective fractions of the one or more non-matching intervals in which values do not meet the first condition; calculating non-matching counts as products of the counts and their respective fractions of the one or more non-matching intervals; identifying one or more ranges corresponding to the one or more non-matching intervals, respectively; determining respective fractions of the one or more ranges in which values meet the second condition; and calculating a sum of products of the non-matching counts and their respective fractions of the one or more ranges.

Clause 20. One or more non-transitory computer-readable media having encoded thereon computer-executable instructions causing one or more processors to perform a method comprising: receiving a query for a database table, wherein the query has a filter comprising a first predicate and a second predicate, wherein the first predicate specifies a first condition evaluating values in a first column of the database table and the second predicate specifies a second condition evaluating values in a second column of the database table; obtaining a projection histogram comprising base statistics of the first column and projected statistics of the second column; and determining an output size of the filter based on the projection histogram, wherein the base statistics of the first column comprise a plurality of intervals and respective counts of cells in the first column whose values are within corresponding intervals, wherein a selected interval defines a set of rows containing a first set of cells in the first column whose values are within the selected interval, wherein the projected statistics of the second column comprise a plurality of ranges corresponding to the plurality of intervals, respectively, wherein the set of rows defined by the selected interval contains a second set of cells in the second column, wherein a range corresponding to the selected interval is defined by a minimum and a maximum of values in the second set of cells.

The technologies from any clause can be combined with the technologies described in any one or more of the other clauses.

EXAMPLE ALTERNATIVES

Although column store database tables are described above as examples, it should be understood that the technologies described herein can also be applied to row store databases, e.g., by transposing a row store table to a column store table.

In view of the many possible embodiments to which the principles of the disclosed technology can be applied, it should be recognized that the illustrated embodiments are examples of the disclosed technology and should not be taken as a limitation on the scope of the disclosed technology. Rather, the scope of the disclosed technology includes what is covered by the scope and spirit of the following claims.

What is claimed is:

1. A computer-implemented method for improving query optimization, comprising:
   receiving a query for a database table, wherein the query has a filter comprising a first predicate and a second predicate, wherein the first predicate specifies a first condition evaluating data values in a first column of the database table and the second predicate specifies a second condition evaluating data values in a second column of the database table;
   obtaining a projection histogram comprising base statistics of the first column and projected statistics of the second column;
   determining an output size of the filter based on the projection histogram,
   wherein determining the output size of the filter comprises:
      determining a group size based on evaluating the base statistics of the projection histogram using the first condition; and
      evaluating the projected statistics of the projection histogram using the second condition,
      wherein the output size is determined based on the group size and results of evaluating the projected statistics; and
   generating a query plan based on the determined output size of the filter,
   wherein the base statistics of the first column comprise a plurality of intervals and respective counts of cells in the first column whose data values are within corresponding intervals, wherein a selected interval defines a set of rows containing a first set of cells in the first column whose data values are within the selected interval,
   wherein the projected statistics of the second column comprise a plurality of ranges corresponding to the plurality of intervals, respectively, wherein the set of rows defined by the selected interval contains a second set of cells in the second column, wherein a range corresponding to the selected interval is defined by a minimum and a maximum of data values in the second set of cells.

2. The computer-implemented method of claim 1, wherein the first predicate and the second predicate have a conjunctive relationship, wherein determining the output size of the filter further comprises:
   adjusting the group size based on the results of evaluating the projected statistics.

3. The computer-implemented method of claim 2, wherein determining the group size comprises:
   identifying a matching interval in the projection histogram which contains at least some data values in the first column that meet the first condition and a count corresponding to the matching interval;

determining a fraction of the matching interval in which the data values in the first column meet the first condition; and multiplying the count by the fraction of the matching interval.

4. The computer-implemented method of claim 3, wherein adjusting the group size comprises:

identifying a range corresponding to the matching interval;

determining a fraction of the range in which the data values in the second column meet the second condition; and multiplying the group size by the fraction of the range.

5. The computer-implemented method of claim 3, wherein the matching interval is one of a plurality of matching intervals, wherein the plurality of matching intervals has corresponding adjusted group sizes, wherein determining the output size of the filter further comprises summing the adjusted group sizes corresponding to the plurality of matching intervals.

6. The computer-implemented method of claim 2, wherein the filter further comprises a third predicate which specifies a third condition evaluating data values in a third column of the database table, wherein the second predicate and the third predicate also have a conjunctive relationship, wherein the projection histogram is a first projection histogram, wherein the group size is a first group size, wherein determining the output size of the filter further comprises:

obtaining a second projection histogram comprising base statistics of the second column and projected statistics of the third column;

determining a second group size based on evaluating the base statistics of the second projection histogram using the second condition;

adjusting the second group size based on evaluating the projected statistics of the second projection histogram using the third condition;

determining a first selectivity as a ratio of the first group size to a total number of rows in the database table;

determining a second selectivity as a ratio of the second group size to the total number of rows in the database table; and determining a product of the first selectivity and the second selectivity.

7. The computer-implemented method of claim 1, wherein the first predicate and the second predicate have a disjunctive relationship, wherein the group size is a first group size, wherein determining the output size of the filter further comprises:

determining a second group size based on evaluating the base statistics of the projection histogram using the first condition and the results of evaluating the projected statistics; and calculating a sum of the first group size and the second group size.

8. The computer-implemented method of claim 7, wherein determining the first group size comprises:

identifying one or more matching intervals in the projection histogram which contain at least some data values in the first column that meet the first condition and respective counts corresponding to the one or more matching intervals;

determining respective fractions of the one or more matching intervals in which the data values in the first column meet the first condition; and calculating a sum of products of the counts and their respective fractions of the one or more matching intervals.

9. The computer-implemented method of claim 8, wherein determining the second group size comprises:

identifying one or more non-matching intervals in the projection histogram which contain at least some data values in the first column that do not meet the first condition and respective counts corresponding to the one or more non-matching intervals;

determining respective fractions of the one or more non-matching intervals in which the data values in the first column do not meet the first condition;

calculating non-matching counts as products of the counts and their respective fractions of the one or more non-matching intervals;

identifying one or more ranges corresponding to the one or more non-matching intervals, respectively;

determining respective fractions of the one or more ranges in which the data values in the second column meet the second condition; and calculating a sum of products of the non-matching counts and their respective fractions of the one or more ranges.

10. The computer-implemented method of claim 9, wherein the filter further comprises a third predicate which specifies a third condition evaluating the data values in a third column of the database table, wherein the second predicate and the third predicate also have a disjunctive relationship, wherein the projection histogram is a first projection histogram, wherein the one or more non-matching intervals are first non-matching intervals, the one or more ranges are first ranges, and the non-matching counts are first non-matching counts, wherein determining the output size of the filter further comprises:

obtaining a second projection histogram comprising base statistics of the second column and projected statistics of the third column;

determining a third group size based on evaluating both the base statistics of the second projection histogram using the second condition and the projected statistics of the second projection histogram using the third condition; and adding the third group size to the sum of the first group size and the second group size, wherein determining the third group size comprises:

identifying one or more second non-matching intervals in the second projection histogram which contain at least some data values in the second column that do not meet the second condition and respective counts corresponding to the one or more second non-matching intervals;

determining respective fractions of the one or more second non-matching intervals in which the data values in the second column do not meet the second condition;

calculating second non-matching counts as products of the counts and their respective fractions of the one or more second non-matching intervals;

identifying one or more second ranges corresponding to the one or more second non-matching intervals, respectively;

determining respective fractions of the one or more second ranges in which the data values in the third column meet the third condition; and calculating a sum of products of the second non-matching counts and their respective fractions of the one or more second ranges.

11. A computing system for improving query optimization, comprising:

memory;

one or more hardware processors coupled to the memory; and one or more non-transitory computer-readable media storing instructions that, when loaded into the memory, cause the one or more hardware processors to perform operations comprising:

receiving a query for a database table, wherein the query has a filter comprising a first predicate and a second predicate, wherein the first predicate specifies a first condition evaluating data values in a first column of the database table and the second predicate specifies a second condition evaluating data values in a second column of the database table;

obtaining a projection histogram comprising base statistics of the first column and projected statistics of the second column;

determining an output size of the filter based on the projection histogram, wherein determining the output size of the filter comprises:

determining a group size based on evaluating the base statistics of the projection histogram using the first condition; and evaluating the projected statistics of the projection histogram using the second condition, wherein the output size is determined based on the group size and results of evaluating the projected statistics; and generating a query plan based on the determined output size of the filter, wherein the base statistics of the first column comprise a plurality of intervals and respective counts of cells in the first column whose data values are within corresponding intervals, wherein a selected interval defines a set of rows containing a first set of cells in the first column whose data values are within the selected interval, wherein the projected statistics of the second column comprise a plurality of ranges corresponding to the plurality of intervals, respectively, wherein the set of rows defined by the selected interval contains a second set of cells in the second column, wherein a range corresponding to the selected interval is defined by a minimum and a maximum of data values in the second set of cells.

12. The computing system of claim 11, wherein the first predicate and the second predicate have a conjunctive relationship, wherein determining the output size of the filter further comprises:

adjusting the group size based on the results of evaluating the projected statistics.

13. The computing system of claim 12, wherein determining the group size comprises:

identifying a matching interval in the projection histogram which contains at least some data values in the first column that meet the first condition and a count corresponding to the matching interval;

determining a fraction of the matching interval in which the data values in the first column meet the first condition; and multiplying the count by the fraction of the matching interval.

14. The computing system of claim 13, wherein adjusting the group size comprises:

identifying a range corresponding to the matching interval;

determining a fraction of the range in which the data values in the second column meet the second condition; and multiplying the group size by the fraction of the range.

15. The computing system of claim 13, wherein the matching interval is one of a plurality of matching intervals, wherein the plurality of matching intervals has corresponding adjusted group sizes, wherein determining the output size of the filter further comprises summing the adjusted group sizes corresponding to the plurality of matching intervals.

16. The computing system of claim 12, wherein the filter further comprises a third predicate which specifies a third condition evaluating data values in a third column of the database table, wherein the second predicate and the third predicate also have a conjunctive relationship, wherein the projection histogram is a first projection histogram, wherein the group size is a first group size, wherein determining the output size of the filter further comprises:

obtaining a second projection histogram comprising base statistics of the second column and projected statistics of the third column;

determining a second group size based on evaluating the base statistics of the second projection histogram using the second condition;

adjusting the second group size based on evaluating the projected statistics of the second projection histogram using the third condition;

determining a first selectivity as a ratio of the first group size to a total number of rows in the database table;

determining a second selectivity as a ratio of the second group size to the total number of rows in the database table; and determining a product of the first selectivity and the second selectivity.

17. The computing system of claim 11, wherein the first predicate and the second predicate have a disjunctive relationship, wherein the group size is a first group size, wherein determining the output size of the filter further comprises:

determining a second group size based on evaluating the base statistics of the projection histogram using the first condition and the results of evaluating the projected statistics; and calculating a sum of the first group size and the second group size.

18. The computing system of claim 17, wherein determining the first group size comprises:

identifying one or more matching intervals in the projection histogram which contain at least some data values in the first column that meet the first condition and respective counts corresponding to the one or more matching intervals;

determining respective fractions of the one or more matching intervals in which the data values in the first column meet the first condition; and calculating a sum of products of the counts and their respective fractions of the one or more matching intervals.

19. The computing system of claim 18, wherein determining the second group size comprises:

US 12,639,322 B2

35 identifying one or more non-matching intervals in the projection histogram which contain at least some data values in the first column that do not meet the first condition and respective counts corresponding to the one or more non-matching intervals;

determining respective fractions of the one or more non-matching intervals in which the data values in the first column do not meet the first condition;

calculating non-matching counts as products of the counts and their respective fractions of the one or more non-matching intervals;

identifying one or more ranges corresponding to the one or more non-matching intervals, respectively;

determining respective fractions of the one or more ranges in which the data values in the second column meet the second condition; and calculating a sum of products of the non-matching counts and their respective fractions of the one or more ranges.

20. One or more non-transitory computer-readable media having encoded thereon computer-executable instructions causing one or more processors to perform a method for improving query optimization, the method comprising:

receiving a query for a database table, wherein the query has a filter comprising a first predicate and a second predicate, wherein the first predicate specifies a first condition evaluating data values in a first column of the database table and the second predicate specifies a second condition evaluating data values in a second column of the database table;

obtaining a projection histogram comprising base statistics of the first column and projected statistics of the second column;

determining an output size of the filter based on the projection histogram, wherein determining the output size of the filter comprises:

determining a group size based on evaluating the base statistics of the projection histogram using the first condition; and evaluating the projected statistics of the projection histogram using the second condition, wherein the output size is determined based on the group size and results of evaluating the projected statistics; and generating a query plan based on the determined output size of the filter, wherein the base statistics of the first column comprise a plurality of intervals and respective counts of cells in the first column whose data values are within corresponding intervals, wherein a selected interval defines a set of rows containing a first set of cells in the first column whose data values are within the selected interval, wherein the projected statistics of the second column comprise a plurality of ranges corresponding to the plurality of intervals, respectively, wherein the set of rows defined by the selected interval contains a second set of cells in the second column, wherein a range corresponding to the selected interval is defined by a minimum and a maximum of data values in the second set of cells.

* * * * *